(12) United States Patent
Raman et al.

(10) Patent No.: US 11,314,417 B2
(45) Date of Patent: Apr. 26, 2022

(54) METHODS AND SYSTEMS FOR NVME TARGET LOAD BALANCING BASED ON REAL TIME METRICS

(71) Applicant: Pensando Systems Inc., Milpitas, CA (US)

(72) Inventors: Balakrishnan Raman, Fremont, CA (US); Chaitanya Huilgol, Bengaluru (IN); Harinadh Nagulapalli, San Jose, CA (US); Murty Subba Rama Chandra Kotha, San Jose, CA (US); Sanjay Shanbhogue, Santa Clara, CA (US); Varada Raja Kumar Kari, Bengaluru (IN); Vishwas Danivas, Santa Clara, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 17/066,303

(22) Filed: Oct. 8, 2020

(65) Prior Publication Data

US 2022/0091754 A1 Mar. 24, 2022

Related U.S. Application Data

(60) Provisional application No. 63/082,420, filed on Sep. 23, 2020.

(51) Int. Cl.
*G06F 3/06* (2006.01)
*G06F 11/34* (2006.01)
*G06F 9/50* (2006.01)

(52) U.S. Cl.
CPC ............ *G06F 3/0613* (2013.01); *G06F 3/067* (2013.01); *G06F 3/0653* (2013.01); *G06F 3/0659* (2013.01); *G06F 3/0664* (2013.01); *G06F 3/0688* (2013.01); *G06F 9/5083* (2013.01); *G06F 11/3409* (2013.01)

(58) Field of Classification Search
CPC .......... G06F 3/06–0689; G06F 9/5083; G06F 11/3409
See application file for complete search history.

(56) References Cited

U.S. PATENT DOCUMENTS 7,123,608 B1 * 10/2006 Scott ................... H04M 3/2218
370/353
8,688,772 B2 * 4/2014 Tsao ...................... G06F 16/182
709/203

(Continued)

OTHER PUBLICATIONS

Infiniband, "Annex A16: RDMA over Converged Ethernet (RoCE)", Supplement to InfiniBand Architecture Specification, vol. 1, Release 1.2.1, Apr. 6, 2010, 19 pgs.

(Continued)

*Primary Examiner* — Nicholas J Simonetti
(74) *Attorney, Agent, or Firm* — Loza & Loza LLP

(57) ABSTRACT

Load balancing of NVMe targets based on real time metrics can be obtained for NAS appliances mirroring a namespace by assigning the NAS appliances to service sets that include an active load balancing set, a monitored inactive set, and an out of service set. Storage performance metrics of the NAS appliances can be tracked by monitoring IO operations for accessing a NAS mirroring the namespace in a non-volatile memory. Based on the storage metrics, NAS appliances can be moved from one of the service sets to another. Dummy IO operations can be used to track the storage performance metrics of monitored inactive NAS appliances such that a monitored inactive NAS may be moved to the active load balancing set when certain performance constraints are met.

20 Claims, 15 Drawing Sheets

(56) References Cited

U.S. PATENT DOCUMENTS

| | | | |
|---|---|---|---|
| 10,764,180 B1* | 9/2020 | Klein | H04L 49/25 |
| 2008/0301479 A1* | 12/2008 | Wood | G06F 1/3203 |
| | | | 713/322 |
| 2015/0178137 A1* | 6/2015 | Gordon | H04L 67/1008 |
| | | | 709/226 |
| 2017/0063973 A1* | 3/2017 | Chawla | H04L 67/1012 |
| 2020/0287829 A1* | 9/2020 | Lam | H04L 45/7453 |
| 2020/0382584 A1* | 12/2020 | Basavaiah | H04L 43/065 |
| 2020/0404047 A1* | 12/2020 | Kurhe | H04L 41/0681 |
| 2021/0295237 A1* | 9/2021 | Taher | G06Q 10/06398 |

OTHER PUBLICATIONS

Infiniband, "Annex A17: RoCEv2", Supplement to InfiniBand, Architecture Specification, vol. 1, Release 1.2.1 Sep. 2, 2014, 23 pgs.
Infiniband, "InfiniBandTM Architecture Specification", vol. 1, Release 1.4, Apr. 7, 2020, 1981 pgs.
NVM Express, "NVM Express over Fabrics", Revision 1.1, Oct. 22, 2019, 83 pgs.
NVM Express, "Base Specification", NVM Express, Revision 1.4, Jun. 10, 2019, 403 pgs.
Chadalapaka, M. et al. "Internet Small Computer System Interface (iSCSI) Protocol (Consolidated)", https://tools.ietf.org/html/rfc7143, retrieved Jul. 31, 2020, 295 pgs.

* cited by examiner

| Storage Performance Metrics (Can be kept for each NVMe Target) 901 | |
| --- | --- |
| IO Read/Write Packet Rate (IO-PPS) | 902 |
| IO Read/Write Bandwidth (IO-BW) | 903 |
| IO Read/Write Setup Latency | 904 |
| IO Read/Write Completion Time | 905 |
| IO Read/Write Round Trip Time (IO-RTT) | 906 |
| IO Read/Write Active Time | 907 |
| IO Read/Write Rate (IOPS) | 908 |
| IO Read/Write Open Transactions | 909 |
| IO Read/Write Size | 910 |
| Other IO Metrics | 911 |

FIG. 9

| IO Operation Monitoring Policies 1001 |
| --- |
| Determine IO Read/Write Completion Time (IO Latency) every 10 seconds for each target device in the active load balancing set. 1002 |
| Determine total IO-BW every 10 seconds for each target device in the active load balancing set. 1003 |
| Determine IO-BW and IO Latency for block size range 1 every 10 seconds for each target device in the active load balancing set. 1004 |
| Determine IO-BW and IO Latency for block size range 2 every 10 seconds for each target device in the active load balancing set. 1005 |
| Determine IO Latency every 60 seconds for each target device in the monitored inactive set. 1006 |
| Determine IO-BW every 120 seconds for each target device in the monitored inactive set. 1007 |
| Determine {Metric} every {Time Period} for {Context}. 1008 |

FIG. 10

| Constraint-Action Table | |
|---|---|
| Constraint | Policy Triggered when Constaint is Met |
| FOR (Targets in Active Load Balancing Set) IF (Target IO-BW < Target Allowed Minimum BW) | Move Target to Monitored Inactive Set |
| FOR (Targets in Active Load Balancing Set) IF (Target Latency > Target Allowed Max Latency) | Move Target to Monitored Inactive Set |
| FOR (Targets in Block Size Range 1 Active Load Balancing Set) IF (Target IO-BW < Target Allowed Minimum BW) | Move Target to Block Size Range 1 Monitored Inactive Set |
| FOR (Targets in Block Size Range 2 Active Load Balancing Set) IF (Target IO-BW < Target Allowed Minimum BW) | Move Target to Block Size Range 2 Monitored Inactive Set |
| FOR (Targets in Monitored Inactive Set) IF ((Target IO-BW > Target Onlining Minimum BW) AND (Target Latency < Target Onlining Max Latency)) | Move Target to Active Load Balancing Set |
| FOR (Targets in Block Size Range 1 Monitored Inactive Set) IF ((Target IO-BW > Target Onlining Minimum BW) AND (Target Latency < Target Onlining Max Latency)) | Move Target to Block Size Range 1 Active Load Balancing Set |
| FOR (Targets in Monitored Inactive Set) IF ((Target Latency > Target Allowed Max Latency) AND (Time Inactive > Maximum Allowed Inactive Period)) | Move Target to Out of Service Set |
| FOR (Targets in Monitored Inactive Set) IF ((Target IO-BW < Target Allowed Minimum BW) AND (Time Inactive > Maximum Allowed Inactive Period)) | Move Target to Out of Service Set |
| FOR (Targets in Service Set) IF (Condition) | Move (Target) to (Other Service Set) |

FIG. 11

METHODS AND SYSTEMS FOR NVME TARGET LOAD BALANCING BASED ON REAL TIME METRICS

TECHNICAL FIELD

The embodiments relate to computer networks, network appliances, network switches, network routers, P4 packet processing pipelines, programmable packet processing pipelines implemented using special purpose circuitry, PCIe (peripheral component interconnect express) cards, SR-IOV (singe root input/output virtualization), VMs (virtual machines), NVMe (non-volatile memory express) interfaces, and NAS (network attached storage).

BACKGROUND

Server farms can have a vast number of host computers running VMs (virtual machines) and most computers have some form of non-volatile memory. In server farms, NAS (network attached storage) appliances can provide that non-volatile memory. As such, the storage elements and the compute elements of the hosts and VMs can be separated. This eases the dynamic scaling of the numbers of hosts and VMs running a workload. Behind all those hosts and VMs (the compute elements), the storage namespaces are provided by mirrored NAS appliances (the storage elements), thereby increasing the aggregate storage bandwidth between the compute elements and the storage elements.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method implemented by a network appliance. The method can include assigning a plurality of NAS appliances (network attached storage appliances) to a plurality of service sets that include an active load balancing set, a monitored inactive set, and an out of service set, wherein the plurality of NAS appliances are configured to mirror a namespace, tracking a storage performance metric of the plurality of NAS appliances by monitoring a plurality of IO operations for accessing a non-volatile memory in the namespace, and moving a NAS appliance into the monitored inactive set based at least in part on a tracked value of the storage performance metric. The method can also include using dummy IO operations to track the storage performance metric of the NAS appliance that was moved into the monitored inactive set, and moving the NAS appliance from the monitored inactive set into the active load balancing set or into the out of service set in response to a value of the storage performance metric that was tracked using the dummy IO operations.

Another aspect of the subject matter described in this disclosure can be implemented by a network appliance. The network appliance can be configured to assign a plurality of NAS appliances (network attached storage appliances) to a plurality of service sets that include an active load balancing set, a monitored inactive set, and an out of service set, wherein the plurality of NAS appliances are configured to mirror a namespace, track a storage performance metric of the plurality of NAS appliances by monitoring a plurality of IO operations for accessing a non-volatile memory in the namespace, and move a NAS appliance into the monitored inactive set based at least in part on a tracked value of the storage performance metric. The network appliance can also be configured to use dummy IO operations to track the storage performance metric of the NAS appliance that was moved into the monitored inactive set, and move the NAS appliance from the monitored inactive set into the active load balancing set or into the out of service set in response to a value of the storage performance metric that was tracked using the dummy IO operations.

Yet another aspect of the subject matter described in this disclosure can be implemented by a network appliance. network appliance system can include a means for assigning a plurality of NAS appliances (network attached storage appliances) to a plurality of service sets that include an active load balancing set, a monitored inactive set, and an out of service set, wherein the plurality of NAS appliances are configured to mirror a namespace. The network appliance can also include a means for accessing a non-volatile memory in the namespace via the plurality of NAS appliances, a means for quantifying IO performance of the plurality of NAS appliances based on the means for accessing the non-volatile memory, a means for determining that a NAS appliances is to be moved into the monitored inactive set, a means for determining that the NAS appliances is to be moved out of the monitored inactive set, and a means for moving the NAS appliances into and out of the monitored inactive set.

In some implementations of the methods and devices, the network appliance includes a control plane and a data plane, and the data plane is configured to track the storage performance metric of the plurality of NAS appliances. In some implementations of the methods and devices, the network appliance includes a P4 packet processing pipeline configured to track the storage performance metric of the plurality of NAS appliances. In some implementations of the methods and devices, the network appliance includes special purpose hardware implementing a packet processing pipeline configured to track the storage performance metric of the plurality of NAS appliances.

In some implementations of the methods and devices, the plurality of IO operations includes a plurality of NVMe commands (Non-Volatile Memory Express commands) received from a host system via a NVMe submission queue implemented by the network appliance. In some implementations of the methods and devices, the network appliance is a SR-IOV (single root IO virtualization) capable PCIe (peripheral component interface express) card installed in a host computer and configured to provide a SR-IOV VF (virtual function) having a NVMe submission queue and a NVMe completion queue, and the plurality of IO operations includes a plurality of NVMe commands received via the NVMe submission queue from a VM (virtual machine) running on the host computer.

In some implementations of the methods and devices, the storage performance metric is an IO latency metric. In some implementations of the methods and devices, the storage performance metric is an IO throughput metric. In some implementations of the methods and devices, the storage performance metric is a block size based metric. In some implementations of the methods and devices, the network appliance includes a control plane, and a data plane that includes a P4 packet processing pipeline configured to track the storage performance metric of the plurality of NAS appliances.

In some implementations of the methods and devices, the network appliance is configured to provide a NVMe submission queue to a host system, and the NVMe submission queue is configured to receive a plurality of NVMe commands for accessing the non-volatile memory in the namespace. In some implementations of the methods and devices, the network appliance is a SR-IOV (single root IO virtualization) capable PCIe (peripheral component interface extended) card installed in a host system and configured to provide a VF (virtual function) including a NVMe submission queue and a NVMe completion queue to a VM (virtual machine) running on the host system. In some implementations of the methods and devices, the network appliance also includes a means for providing a NVMe command queue to a VM (virtual machine) running in a means for running the VM, wherein the means for running the VM comprises the network appliance.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 9 illustrates a non-limiting set of storage performance metrics that can be measured in real time by a network appliance according to some aspects.

FIG. 10 illustrates a non-limiting set of IO operation monitoring policies that can be implemented by a network appliance according to some aspects.

FIG. 11 is a high-level diagram illustrating a non-limiting example of a constraint-action table 1101 that can be implemented by a data plane according to some aspects.

Throughout the description, similar reference numbers may be used to identify similar elements.

DETAILED DESCRIPTION

Figure 1:
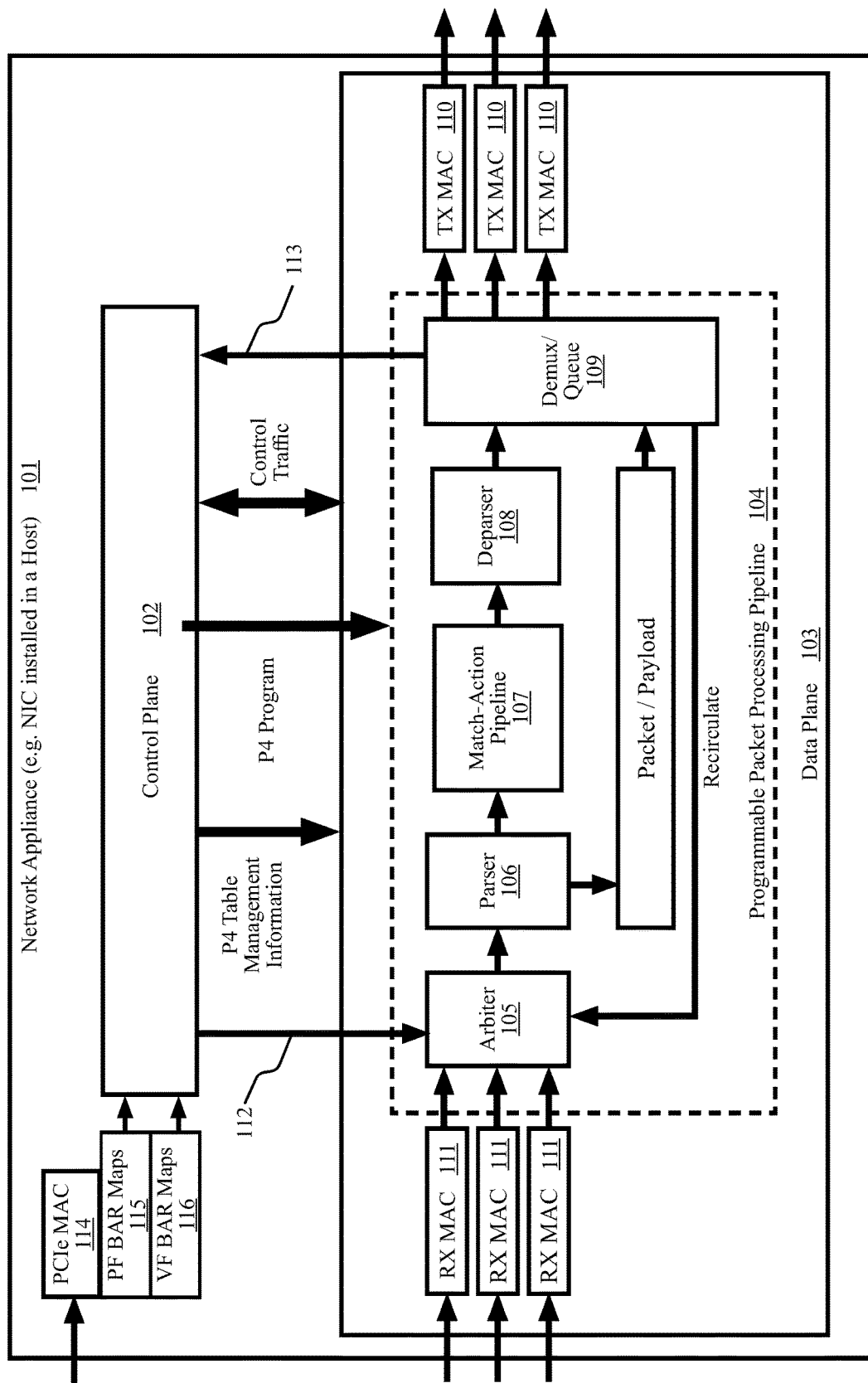
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Server farms can have a vast number of host computers running VMs (virtual machines) and most computers have some form of non-volatile memory. In server farms, NAS (network attached storage) appliances can provide that non-volatile memory. As such, the storage elements and the compute elements of the hosts and VMs can be separated. This eases the dynamic scaling of the numbers of hosts and VMs running a workload. Behind all those hosts and VMs (the compute elements), the storage namespaces are provided by mirrored NAS appliances (the storage elements), thereby increasing the aggregate storage bandwidth between the compute elements and the storage elements.

The workload runs more efficiently when there are no bottlenecks slowing access to the NAS appliances. Load balancing the NAS accesses can relieve bottlenecks. One form of load balancing is a dedicated "load balancer" installed in the network between the hosts and the NAS. Such a load balancer can monitor all the NAS appliances and can direct namespace memory transactions to the least burdened NAS. Such load balancers can be points of failure, expensive, and may even introduce new bottlenecks.

A decentralized form of load balancing is made possible by configurable NICs (network access cards) installed in the hosts. The NICs can be configured to provide NVMe (non-volatile memory express) interfaces to the host it is installed in and to the VMs running on the host. The NICs can also be configured to monitor the communications with the NAS appliances. As such, the NIC collects storage performance metrics for the NAS appliances. When a compute element attaches to a namespace, the NIC can select a NAS appliance from a set of well performing NAS from the NICs perspective. At the same time, a set of well performing NAS devices for another NIC in a different host may have a non-identical set of well performing NAS devices.

One of the advantages is that the resulting decentralized load balancing is adaptive to the network as seen from the NIC, removes the need for dedicated load balancing devices, removes points of failure, and reduces bottlenecking of the transactions.

In the field of data networking, the functionality of network appliances such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O traffic flows with a NAS, extremely quickly if the match-action pipeline is configured to process those traffic flows. Upon receiving a packet of a network traffic flow or NVMe submission/completion, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match action pipeline is not yet configured to process. If there is no match, then the match-action pipeline can perform a default action.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

FIG. 1 is a functional block diagram of a network appliance having a control plane and a data plane and in which aspects may be implemented. A network appliance 101, such as a NIC, can have a control plane 102 and a data plane. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include NVM Express (NVMe) controller management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MAC 111 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 110 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding.

As illustrated in FIG. 1, a P4 program is provided to the data plane via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, NVME-oF packets, iSCSI packets, etc.) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 305 for additional processing.

A NIC 101 can have a PCIe (peripheral component interconnect extended) interface such as PCIe MAC (media access control) 114. A PCIe MAC can have a BAR (base address register) at a base address in a host system's memory space. Processes, typically device drivers within the host systems operating system, can communicate with the NIC via a set of registers beginning with the BAR. Some PCIe devices are SR-IOV (single root input output virtualization) capable. Such PCIe devices can have a PF (physical function) and multiple virtual functions (VFs). A PF BAR map 115 can be used by the host machine to communicate with the PCIe card. A VF BAR map 116 can be used by a VM running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an NVMe controller via another PF. As such, the NIC can provide "NIC" VFs and "NVMe" VFs to VMs running on the host. The NVMe PF and VFs can be used to access remote non-volatile storage on SAN (storage area network) storage devices.

Figure 2:
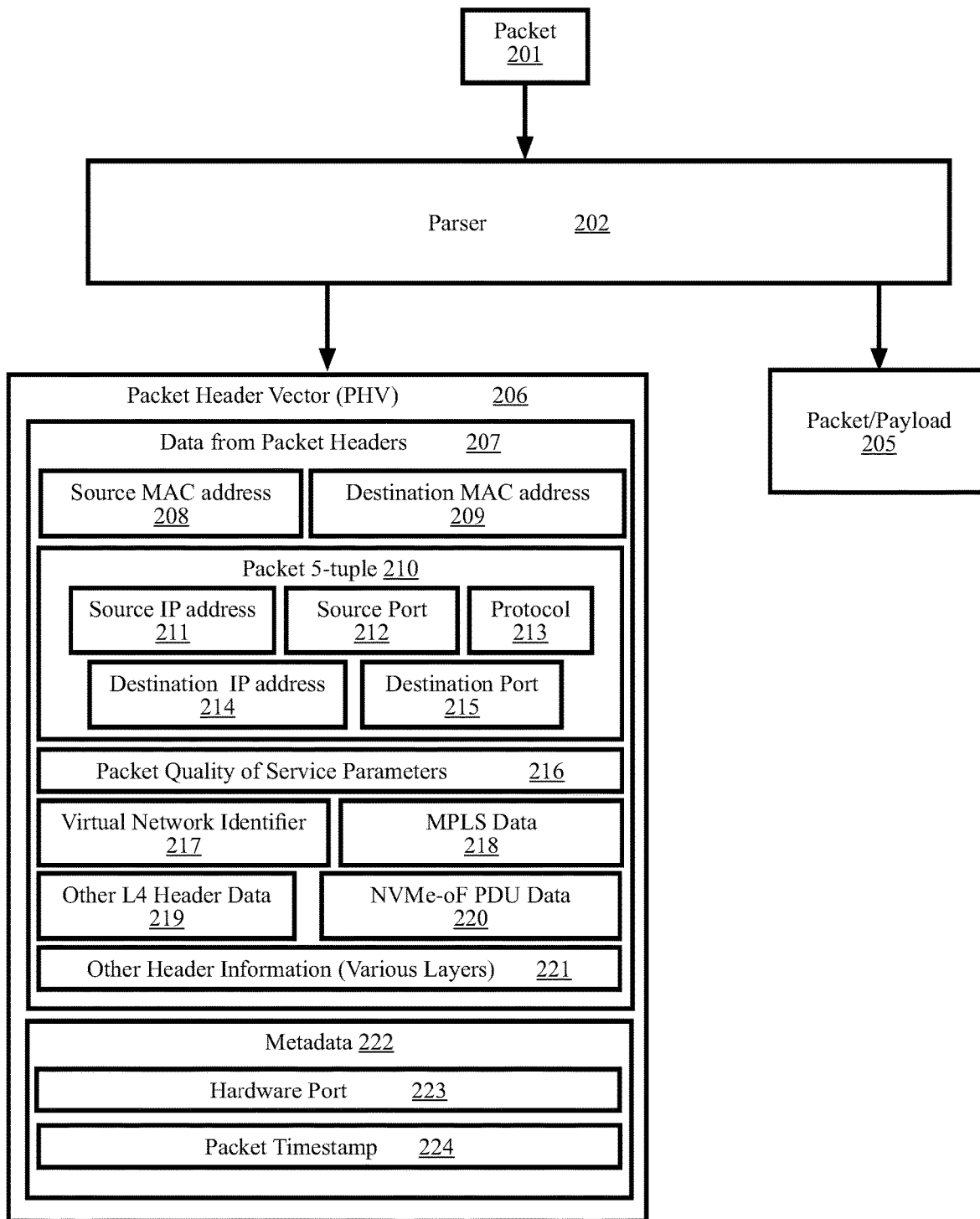
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The NVMe-oF (NVMe over fiber) PDU (protocol data unit) data 220 can be obtained from the packet's layer 7 header and layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload.

Those practiced in SAN (storage area network) protocols such as NVMe-oF, iSCSI (internet small computer systems interface), and Infiniband realize that the data packets communicated by SANs also have well defined and standardized formats. As such, SAN packets and packet headers can be easily created and processed by a programmable data plane such as the data plane of a P4 programmable NIC. Specifically, the parser can parse SAN packets, the match-action pipeline can process SAN packets, the deparser can assemble SAN packet headers, the demux/queue can assemble SAN packets, and the network appliance or NIC can send and receive SAN packets.

A NIC can receive packets via a PCIe interface in accordance with the PCIe specifications. The control plane can process the PCIe packets or the data plane can process the PCIe packets if properly configured to do so by the control plane. For example, the NIC can act as an NVMe controller that receives NVMe submissions from the host and that provides NVMe completions to the host. The data formats of NVMe submissions and completions are defined by the NVMe specifications. As such, the data plane can be configured by the control plane via P4 programming to process NVMe submissions from a VM running on the host to thereby produce NVMe-oF (or iSCSI, etc.) packets that are sent to a SAN storage device. The results from the SAN storage device can be processed by the data plane to produce NVMe completions that are provided to the VM. This example showcases the programmability of a P4 programmable NIC in that PCIe packets carrying NVMe submissions can be processed to send packets to a SAN device using any of the well documented SAN protocols and the results from the SAN device can be processed to produce NVMe completions. Here, the NIC is transparently translating between base protocols.

Figure 3:
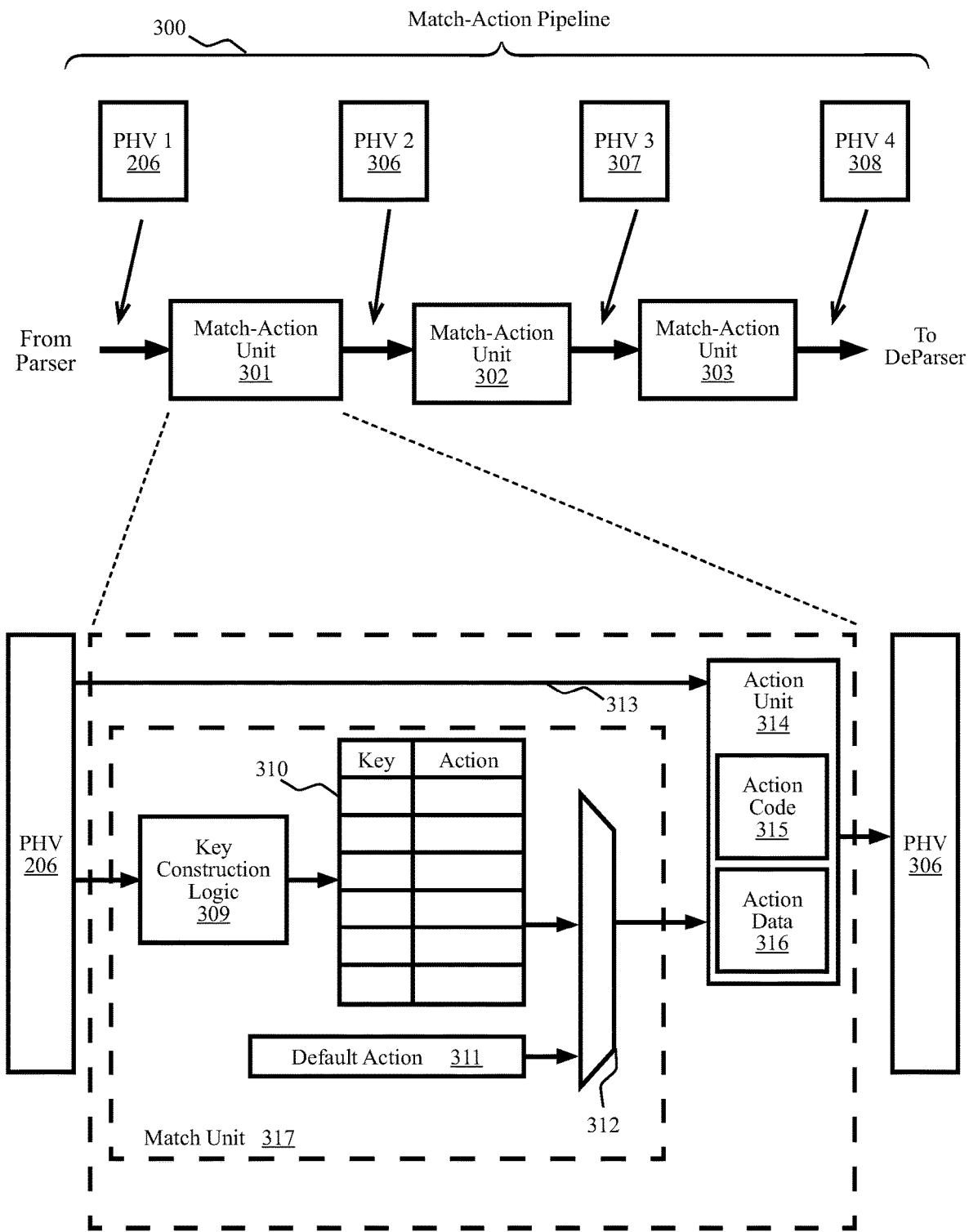
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 206 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 206 and an action unit 314 that produces an output PHV 306, which may be a modified version of the input PHV 206. The match unit 317 can include key construction logic 309, a lookup table 310, and selector logic 312. The key construction logic 309 is configured to generate a key from at least one field in the PHV. The lookup table 310 is populated with key-action pairs, where a key-action pair can include a key (e.g., a lookup key) and corresponding action code 315 and/or action data 316. In an embodiment, a P4 lookup table generalizes traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. In an embodiment, operations of the match-action unit are programmable in the control plane via P4 and the contents of the lookup table is managed by the control plane.

Figure 4:
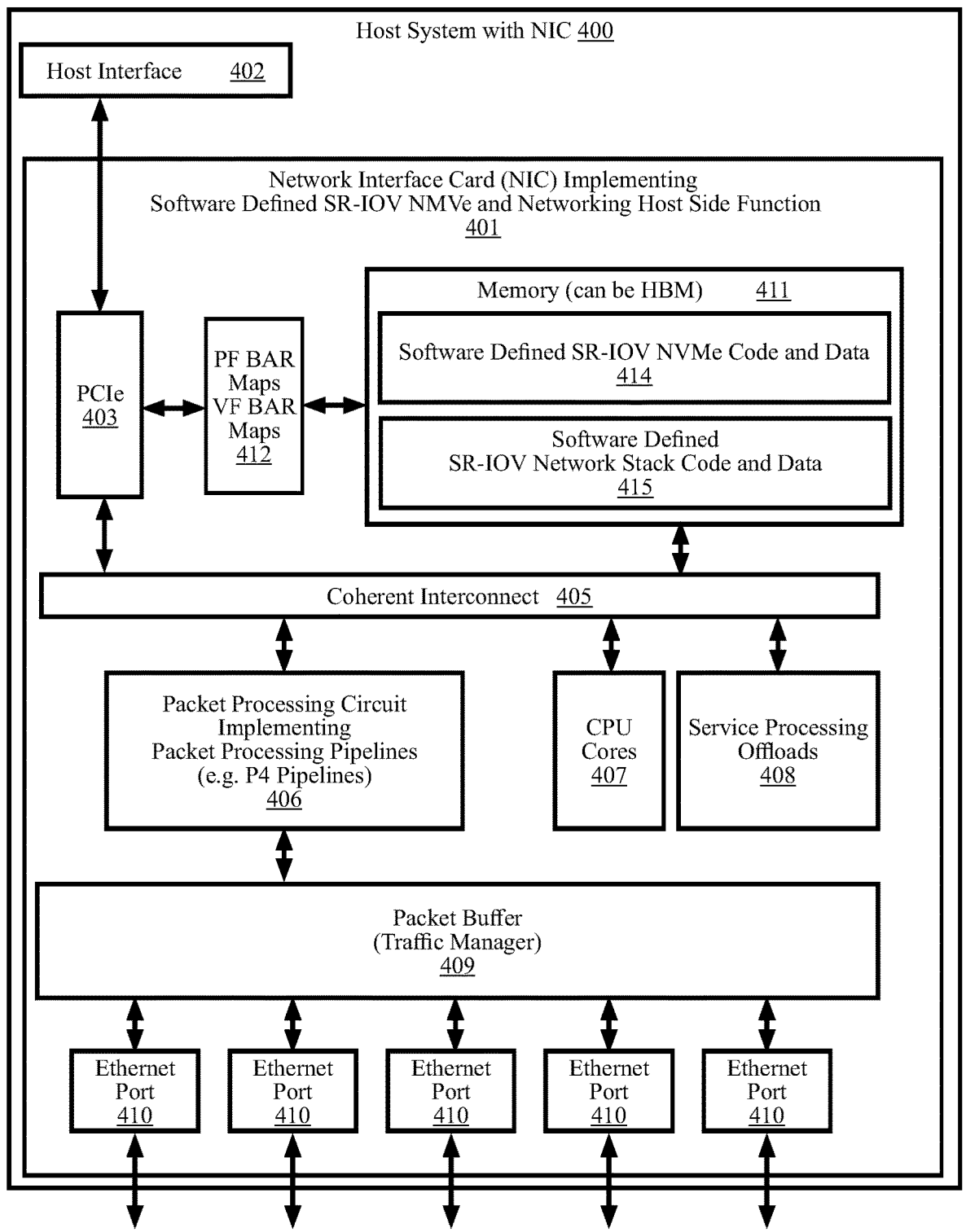
FIG. 4 is a high-level diagram of a network interface card (NIC) configured as a network appliance according to some aspects.

FIG. 4 is a high-level diagram of a network interface card (NIC) 401 configured as a network appliance according to some aspects. Aspects of the embodiments, including packet processing pipelines, fast data paths, and slow data paths, can be implemented in the NIC 401. The NIC 401 can be configured for operation within a host system 400. The host system can be a general-purpose computer with a host interface 402 such as a PCIe interface. The NIC 401 can have a PCIe interface 403 through which it can communicate with the host system 400. The NIC can also include a memory 411, a coherent interconnect 405, a packet processing circuit implementing a packet processing pipeline (e.g. P4 pipelines) 406, CPU cores 407, service processing offloads 408, packet buffer 409, and ethernet ports 410.

As discussed above, the P4 pipelines are configured for programming via a P4 domain-specific language for programming the data plane of network appliances that is currently defined in the "P4$_{16}$ Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification.

The NIC 401 can include a memory 411 for running Linux or some other operating system, for storing large data structures such as flow tables and other analytics, and for providing buffering resources for advanced features including TCP termination and proxy, deep packet inspection, storage offloads, and connected FPGA functions. The memory system may comprise a high bandwidth module (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

In an embodiment, the CPU cores 407 are general purpose processor cores, such as ARM processor cores, MIPS (Microprocessor without Interlocked Pipeline Stages) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU core 407 also includes a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are multiple CPU cores 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 408 are specialized hardware modules purposely optimized to handle specific tasks at wire speed, such as cryptographic functions, compression/decompression, etc.

The packet buffer 409 can act as a central on-chip packet switch that delivers packets from the network interfaces 410 to packet processing elements of the data plane and vice-versa. The packet processing elements can include a slow data path implemented in software and a fast data path implemented by packet processing circuitry 406.

The packet processing circuit implementing packet processing pipelines 406 can be a specialized circuit or part of a specialized circuit using one or more ASICs or FPGAs to implement a programmable packet processing pipeline such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 407 and memory 404 are configured via software to implement a slow data path. A network appliance having two data paths has a fast data path and a slow data path when one of the data paths process packets faster than the other data path.

All memory transactions in the NIC 401, including host memory, on board memory, and registers may be connected via a coherent interconnect 405. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing packet processing pipelines 406, CPU cores 407, and PCIe interface 403. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

The memory can contain data and executable code such as software defined SR-IOV network stack code and data 415. The PF BAR maps and VF BAR maps 412 can map PCIe register locations to specific locations with the NIC's memory 411. As such, the host and VMs can write to PCIe "registers" that are actually specified memory locations within the NIC's memory 411. The software defined SR-IOV network stack code is executable code that can be executed by the CPU cores to thereby implement NIC functionality. As such, the NIC PF and the NIC VF's are simply chunks of memory 411 that are read and written by software defined SR-IOV network stack code as executable code. The PF's and VF's can therefore be termed "software defined" because the NIC can instantiate different numbers of PFs and VFs by allocated different amounts of memory 411 as PCIe registers. The NIC 401 can therefore implement one or more NIC PFs and an arbitrary number of NIC VFs.

The memory can contain data and executable code such as software defined SR-IOV NVMe code and data. Here, the executable code implements software defined NVMe controllers. The NIC 401 can implement one or more NVMe controller PFs and an arbitrary number of NVMe controller VFs. Interestingly, the software defined NVMe controllers may use the software defined NICs to access remote storage via a SAN.

Above, it was contemplated that the CPU cores execute the software defined SR-IOV network stack code and the software defined SR-IOV NVMe code. In practice, the packet processing pipeline 406 can be configured to process I/O commands received via the PCIe interface. For example, the packet processing pipeline 406 can be configured to access the "registers" in memory 411 and thereby process 110 commands therein. In another example, the CPUs can store the I/O commands as packets within the packet buffer such that the packet processing pipeline 406 process the commands as it would process other packets received via any other interface or port.

Figure 5:
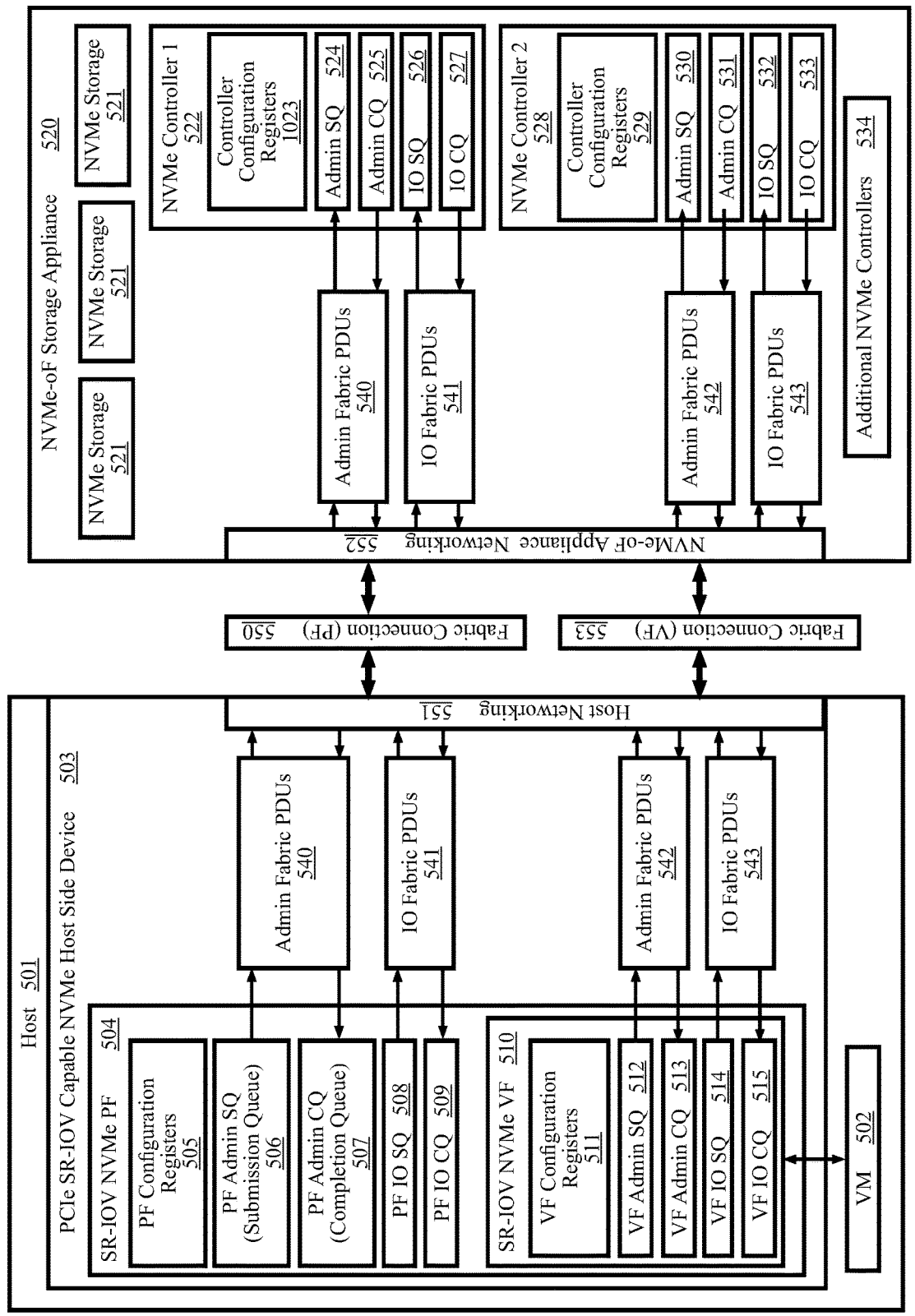
FIG. 5 is a high-level block diagram of a non-limiting example of a VM (virtual machine) running in a host computer and accessing a NAS (network attached storage) via a SR-IOV (single root input/output virtualization) PCIe (peripheral component interconnect extended) card according to some aspects.

FIG. 5 is a high-level block diagram of a non-limiting example of a VM 502 (virtual machine) running in a host computer 501 and accessing a NAS 520 (network attached storage) via a SR-IOV (single root input/output virtualization) PCIe (peripheral component interconnect extended) card 503 according to some aspects. The example of FIG. 5 is provided to introduce some of the base concepts and aspects of NVMe interface, NVMe controllers, and SANs. The PCIe SR-IOV capable NVMe host side device 503 can be a NIC as described above and, for brevity, will here be called a NIC. The NIC 503 can provide a PF 504 and one or more VFs 510. The PF 504 is a SR-IOV NVMe PF 504 and the VF 510 is a SR-IOV NVMe VF 510. The SR-IOV NVMe PF 504 can have PF configuration registers 505, a PF admin SQ (submission queue) 506, a PF admin CQ (completion queue) 507, a PF IO SQ 508, and a PF IO CQ 509. The SR-IOV NVMe VF 510 can have VF configuration registers 511, a VF admin SQ 512, a VF admin CQ 513, a VF IO SQ 514, and a VF IO CQ 515.

The NVMe host side device 503 can provide access to a NAS via a SAN. In FIG. 5, the NAS is a NVMe-oF storage appliance 520 having NVMe storage 521 that can be accessed via NVMe controller 1 522, NVMe controller 2 528, and additional NVMe controllers 534. NVMe controller 1 522 can have controller configuration registers 523, an admin SQ 524, an admin CQ 525, an IO SQ 56, and an IO CQ 527. NVMe controller 2 528 can have controller configuration registers 529, an admin SQ 530, an admin CQ 531, an IO SQ 532, and an IO CQ 533. The controller configuration registers 523, 529 can be set up and maintained by the NAS 520.

A NVMe SQ is a submission queue that can accept submissions from a host machine or VM. The submissions can be requests to attach to a particular NVMe namespace, to store data, or to return data. A NVMe CQ is a completion queue that can receive the results of the submissions. For example, a submission that requests storage of data can have a completion that confirms successful storage of the data. The admin queues can be used for administrative requests such as attachment to a controller, getting or setting features, getting log pages, setting up IO queues, etc. The IO queues can service submissions for storing data into non-volatile storage or for returning data stored in non-volatile storage. Some implementations have no admin queues because the administrative transactions are handled via IO queues.

FIG. 5 has a SAN wherein PDUs (protocol data units) are carried between host networking 551 and NVMe-oF appliance networking 552 via fabric connections 550, 553. The PF fabric connection 550 can carry the PF's admin fabric PDUs 540 and IO fabric PDUs 541 between the host 501 and the NVMe-oF appliance networking 552. The VF fabric connection 553 can carry the VF's admin fabric PDUs 542 and IO fabric PDUs 543 between the host 501 and the NVMe-oF appliance networking 552.

The host 501 can place an administrative NVMe submission on PF admin SQ 506. The NIC can translate the NVMe submission into an admin fabric PDU 540 that is sent to the NAS 520 where it is translated to an NVMe submission that is placed onto admin SQ 524. NVMe controller 1 523 services the submission resulting in a NVMe completion that is translated into an admin fabric PDU 540, returned to the host 501 via the SAN, and translated into a NVMe completion that is placed in PF admin CQ 507. The host 501 can then process the completion.

The host 501 can place an IO submission on PF IO SQ 508. The NIC can translate the submission into an IO fabric PDU 541 that is sent to the NAS 520 where it is translated to a submission that is placed onto IO SQ 526. NVMe controller 1 523 services the submission resulting in a completion that is translated into an IO fabric PDU 541, returned to the host 501 via the SAN, and translated into a completion that is placed in PF IO CQ 509. The host 501 can then process the completion.

The VM 502 can place an administrative submission on VF admin SQ 512. The NIC can translate the submission into an admin fabric PDU 542 that is sent to the NAS 520 where it is translated to a submission that is placed onto admin SQ 530. NVMe controller 2 528 services the submission resulting in a completion that is translated into an admin fabric PDU 542, returned to the host 501 via the SAN, and translated into a completion that is placed in VF admin CQ 513. The VM 502 can then process the completion.

The VM 502 can place an IO submission on VF IO SQ 514. The NIC can translate the submission into an IO fabric PDU 543 that is sent to the NAS 520 where it is translated to a submission that is placed onto IO SQ 532. NVMe controller 2 528 services the submission resulting in a completion that is translated into an IO fabric PDU 543, returned to the host 501 via the SAN, and translated into a completion that is placed in VF IO CQ 515. The VM 502 can then process the completion.

The specific protocol of the fabric PDUs 540, 541, 542, 543 can be any of the SAN protocols such as NVMe/TCP, NVMe/RoCE v1, NVMe/RoCE v2, or iSCSI. A NIC, such as a NIC with a programmable packet processing pipeline can easily translate between NVMe submissions/completions and any of the SAN protocols.

FIGS. 6A-6H illustrate packet headers and payloads of packets for network traffic flows 600 and NAS (network attached storage) access according to some aspects. A network traffic flow 600 can have numerous packets such as a first packet 622, a second packet 623, a third packet 624, a fourth packet 625, and a final packet 626 with many more packets between the fourth packet 625 and the final packet 626. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 601 and layer 2 payload 602. The layer 2 header can contain a source MAC address 603, a destination MAC address 604, and other layer 2 header data 605. The input ports 111 and output ports 110 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 602 can include a Layer 3 packet.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 606 and a layer 3 payload 607. The layer 3 header 606 can have a source IP address 608, a destination IP address 609, a protocol indicator 610, and other layer 3 header data 611. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 603 indicating the first node, a destination MAC address 604 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 603 indicating the intermediate node, a destination MAC address 604 indicating the second node, and the IP packet as a payload. The layer 3 payload 607 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 606 using protocol indicator 610. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 607 includes a TCP header and a TCP payload. UDP can provide for computer applications to send messages, in this case referred to as datagrams, to other hosts on an IP network using a connectionless model. When carrying UDP data, a layer 3 payload 607 includes a UDP header and a UDP payload. ICMP is used by network devices, including routers, to send error messages and operational information indicating success or failure when communicating with another IP address. ICMP uses a connectionless model.

A layer 4 packet can have a layer 4 header 612 and a layer 4 payload 613. The layer 4 header 612 can include a source port 614, destination port 615, layer 4 flags 616, and other layer 4 header data 617. The source port and the destination port can be integer values used by host computers to deliver packets to application programs configured to listen to and send on those ports. The layer 4 flags 616 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 613 can contain a layer 7 packet.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), the Dynamic Host Configuration Protocol (DHCP), and the NVMe/TCP protocol. Data coded according to application layer protocols can be encapsulated into transport layer protocol units (such as TCP or UDP messages), which in turn use lower layer protocols to effect actual data transfer.

A layer 7 packet may be a NVMe/TCP PDU 618 having a NVMe/TCP PDU header 619 and a NVMe/TCP PDU payload 620. NVMe/TCP is one of the common SAN protocols and can be used to implement NVMe-oF transactions between hosts and NAS appliances.

Figure 6A:
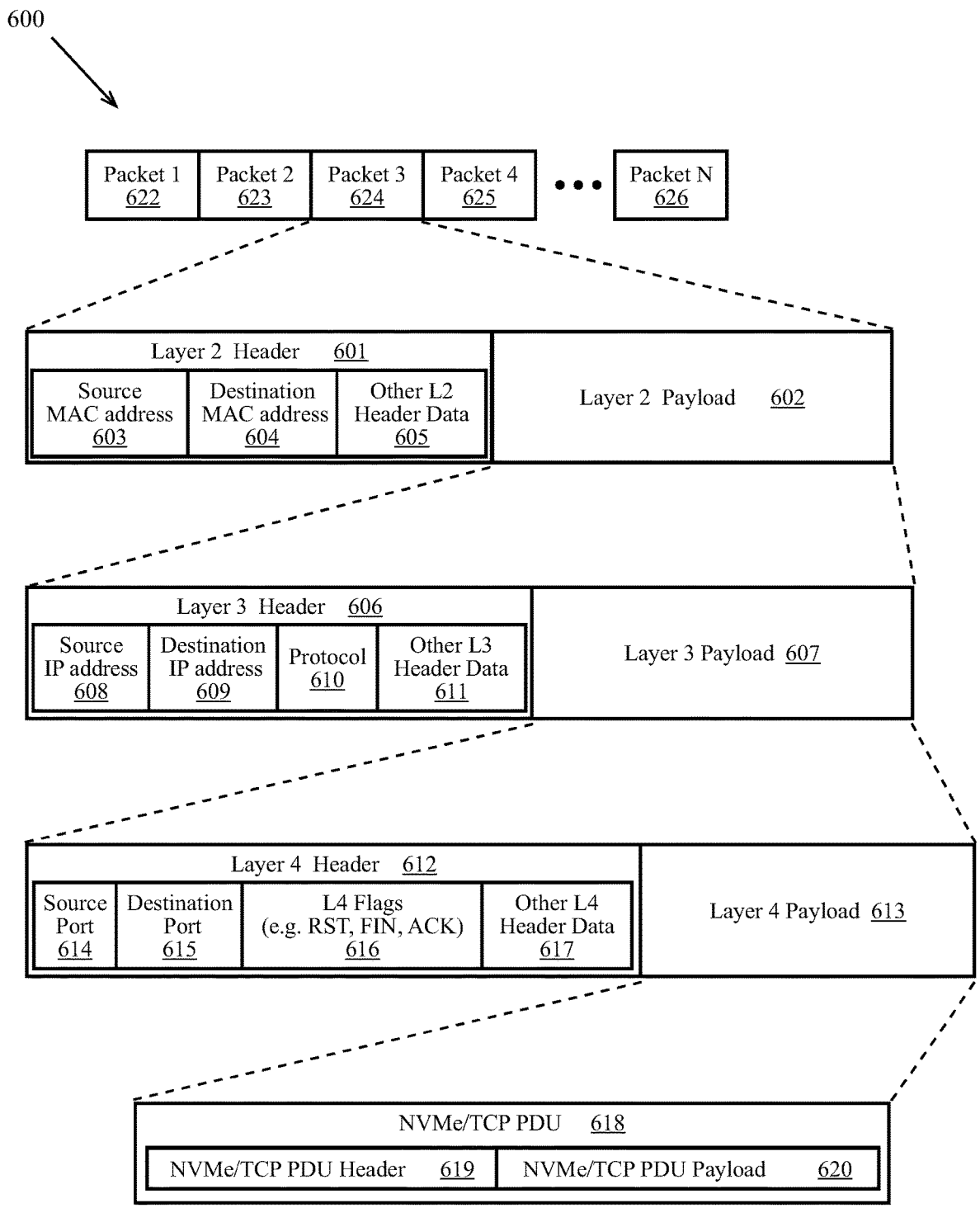
FIGS. 6A-6H illustrate packet headers and payloads of packets for network traffic flows and NAS (network attached storage) access according to some aspects.
Figure 6B:
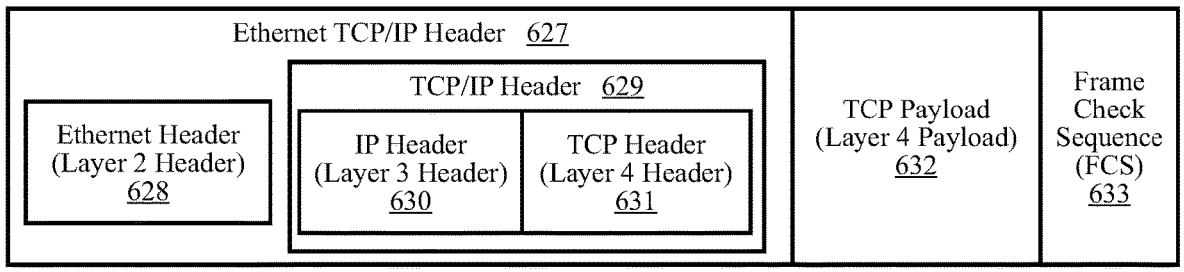
Figure 6C:
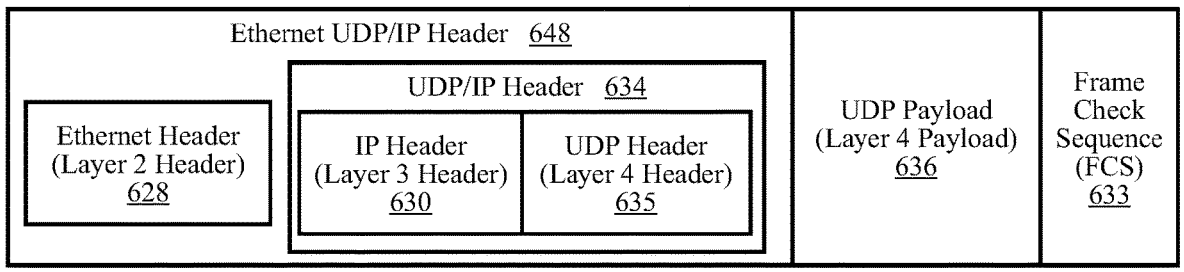

FIGS. 6B and 6C illustrate TCP/IP and UDP/IP Ethernet packets. Ethernet packets, such as TCP/IP and UDP/IP Ethernet packets, have an Ethernet header 628 and a frame check sequence (FCS) 633. As discussed above, Ethernet is a layer 2 protocol. An Ethernet TCP/IP header 627 has an Ethernet header 628 and a TCP/IP header 629. The TCP/IP header 629 has an IP header 630 and a TCP header 631. The Ethernet TCP/IP packet has a TCP payload 632 as the layer 4 payload. An Ethernet UDP/IP packet differs from an Ethernet TCP/IP packet by having UDP as the layer 4 protocol. The Ethernet UDP/IP header 648 has an Ethernet header 628 and a UDP/IP header 634. The UDP/IP header 634 has an IP header 630 and a UDP header 635. The Ethernet UDP/IP packet has a UDP payload 636 as the layer 4 payload.

NVMe is a communications protocol that has been used between host controllers and non-volatile storage devices. NVMe was originally designed for carrying commands and data between storage controllers and non-volatile storage devices attached to the same PCIe bus. NVMe over Fabric (NVMe-oF) is a technology that adapts NVMe for connecting storage controllers and non-volatile storage devices connected over a network. Implementations of NVMe-oF include NVMe/TCP, NVMe/RoCE. (RDMA (remote direct memory access) over Converged Ethernet), and NVMe over Fibre Channel. There are currently two versions of NVMe/RoCE, NVMe/RoCE v1 and NVMe/RoCE v2. NVMe-oF is defined in "NVM Express over Fabrics," version 1.1, as published by NVM Express, Inc. on Oct. 22, 2019. RoCE is defined in "Supplement to InfiniBand Architecture Specification Volume 1 Release 1.2.1, Annex 16 RDMA over Converged Ethernet (RoCE)" as published by the Infiniband Trade Association on Apr. 6, 2010. RoCE v2 is defined in "Supplement to InfiniBand Architecture Specification Volume 1 Release 1.2.1, Annex 17 RoCEv2" as published by the Infiniband Trade Association on Sep. 2, 2014.

Figure 6D:
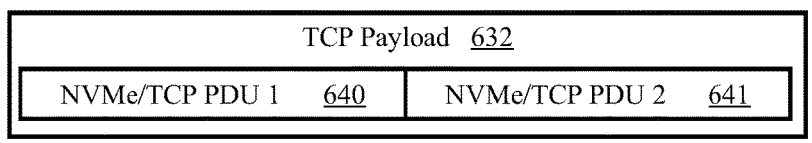
Figure 6E:
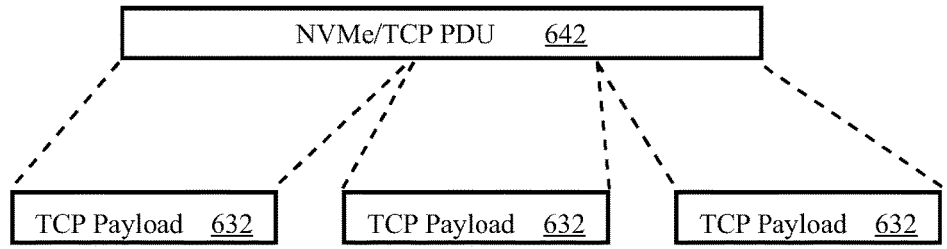

FIGS. 6D-6E illustrate the TCP payloads 632 of NVME/TCP packets. FIG. 6D illustrates a single TCP/IP payload 632 having multiple NVMe/TCP PDUs, NVMe/TCP PDU 1 640 and NVMe/TCP PDU 2 641. FIG. 6E illustrates multiple TCP payloads 632 of multiple TCP packets carrying a single NVMe/TCP PDU 642.

Figure 6F:
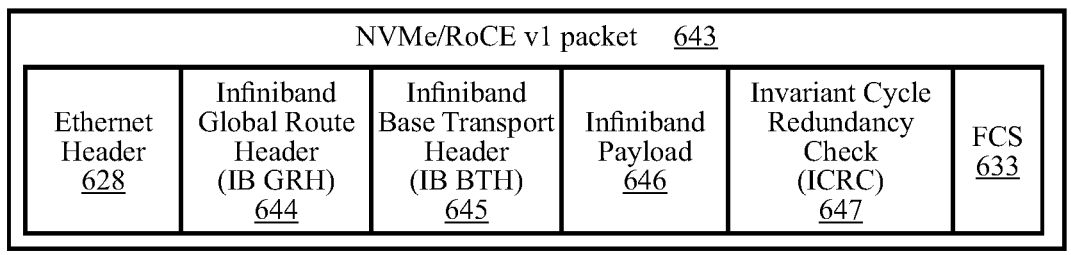

FIG. 6F illustrates a NVMe/RoCE v1 packet 643. The NVMe/RoCE v1 packet 643 can be seen to be an ethernet packet having an Ethernet payload that includes an Infiniband Global Route Header (IB GRH) 644, an Infiniband Base Transport Header (IB BTH) 645, an Infiniband payload 646, and an Invariant Cyclic Redundancy Check (ICRC) 647 field.

Figure 6G:
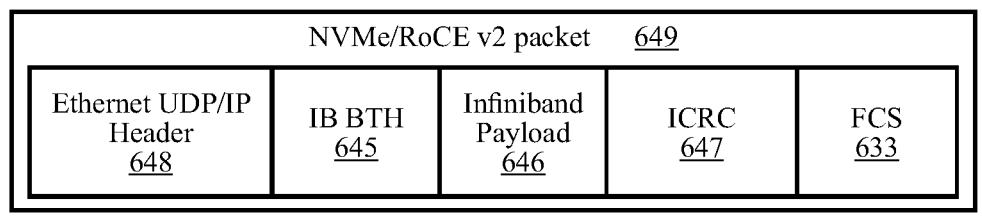
Figure 6H:
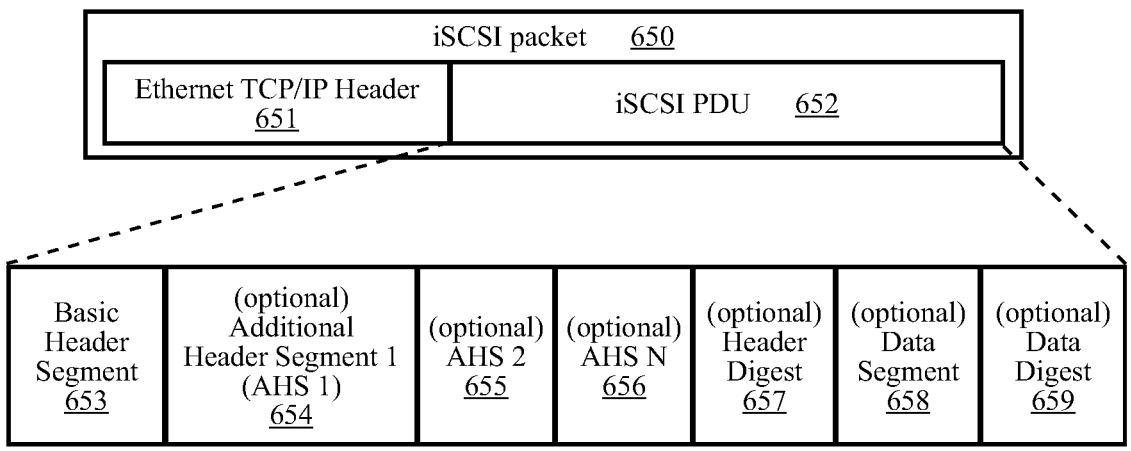

FIG. 6G illustrates a NVMe/RoCE v2 packet 649. The NVMe/RoCE v2 packet 649 can be seen to be an Ethernet UDP/IP packet having a UDP payload that includes the IB BTH 645, the Infiniband payload 646, and the ICRC 647. Here, Ethernet is the layer 2 transport for a UDP packet carrying the Infiniband elements. Other layer 2 protocols may be used as the layer 2 transport.

FIG. 6 H illustrates an iSCSI packet 650 having an Ethernet TCP/IP header 651 and an iSCSI PDU 652. The IETF (Internet Engineer Task Force) is a consortium that develops and publishes standards for the Internet in the form of RFCs (requests for comment). The iSCSI packet format is specified in IETF RFC 7143 titled "Internet Small Computer System Interface (iSCSI) Protocol", published in April, 2014. The iSCSI PDU 652 can contain a basic header segment 653, a first AHS (additional header segment) 654, a second AHS 655, an Nth AHS 656, a header digest 657, a data segment 658, and a data digest 659.

Figure 7:
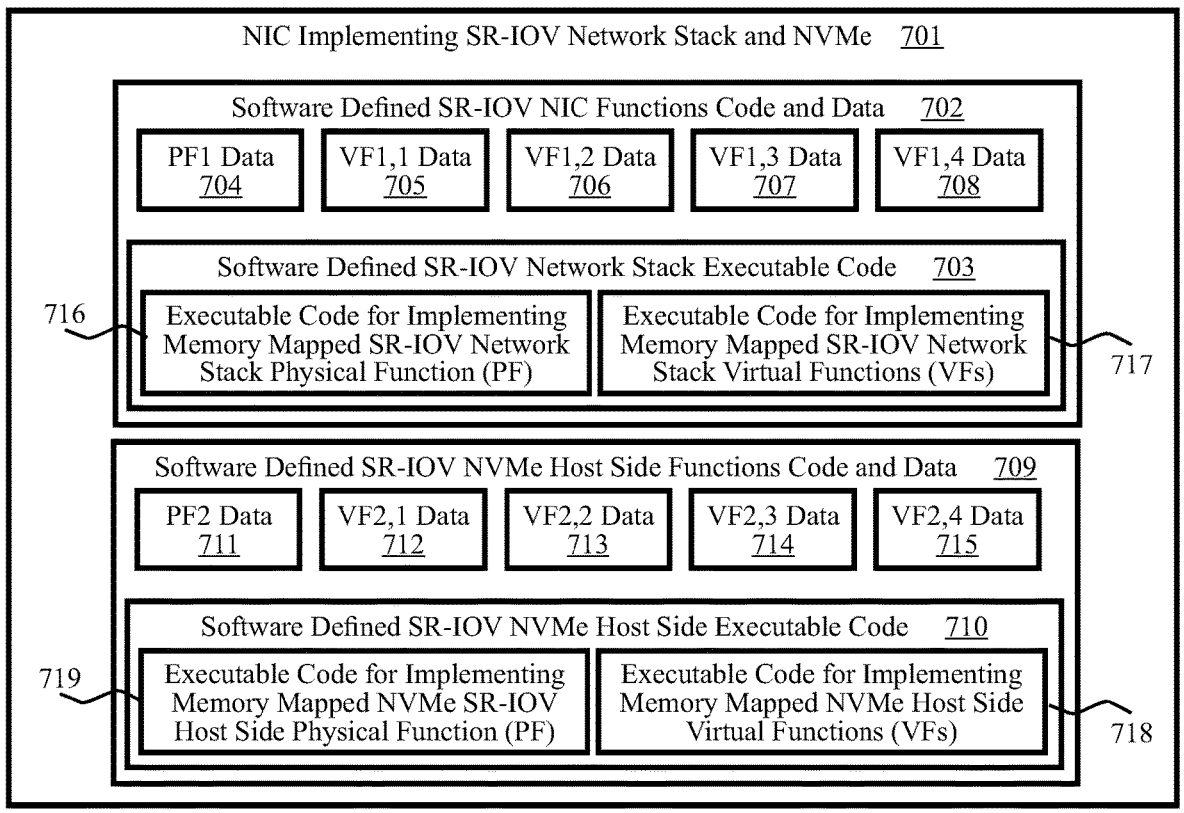
FIG. 7 is a high-level block diagram of a non-limiting example of a NIC (network Interface card) implementing a SR-IOV network stack and SR-IOV NVMe according to some aspects.

FIG. 7 is a high-level block diagram of a non-limiting example of a NIC 701 implementing a SR-IOV network stack and NVMe according to some aspects. As discussed above, a SR-IOV capable NIC having PF BAR mapping, VF BAR mapping, on board memory, and a configurable packet processing pipeline can be configured to implement a software defined NIC and a software defined NVMe interface. The NIC can contain software defined SR-IOV NIC functions code and data 702 and software defined SR-IOV NVMe host side functions code and data 709.

The software defined SR-IOV NIC functions code and data 702 can contain software defined SR-IOV network stack executable code 703. Network stack executable code can be executed by the NIC to process packets such as those of FIG. 6A-6H including reading, writing, rewriting, forwarding, and processing the packets. The code can include executable code for implementing a memory mapped SR-IOV network stack physical function (NIC PF) 716 and executable code for implementing a memory mapped SR-IOV network stack virtual functions (NIC VFs) 717. The NIC PF is the PCIe card's first physical function, PF1. PF1 can have VFs such as VF1,1, VF1,2, VF1,3, and VF1,4. Implementing a software defined NIC PF includes maintaining PF1 data 704. Implementing the VFs includes maintaining VF1,1 data 705, VF1,2 data 706, VF1,3 data 707, and VF1,4 data 708.

The software defined SR-IOV NVMe host side functions code and data 709 can contain software defined SR-IOV NVMe host side executable code 710. NVMe host side executable code can be executed by the NIC to process NVMe submissions and NVMe completions from the host and to access storage on a NAS via a SAN. The code can include executable code for implementing a memory mapped NVMe SR-IOV host side physical function (NVMe PF) 719 and executable code for implementing a memory mapped NVMe SR-IOV host side virtual functions (NVMe VFs) 718. The NVMe PF is the PCIe card's second physical function, PF2. PF2 can have VFs such as VF2,1, VF2,2, VF2,3, and VF2,4. Implementing a software defined NVMe PF includes maintaining PF2 data 711. Implementing the VFs includes maintaining VF2,1 data 712, VF2,2 data 713, VF2,3 data 714, and VF2,4 data 715.

Figure 8:
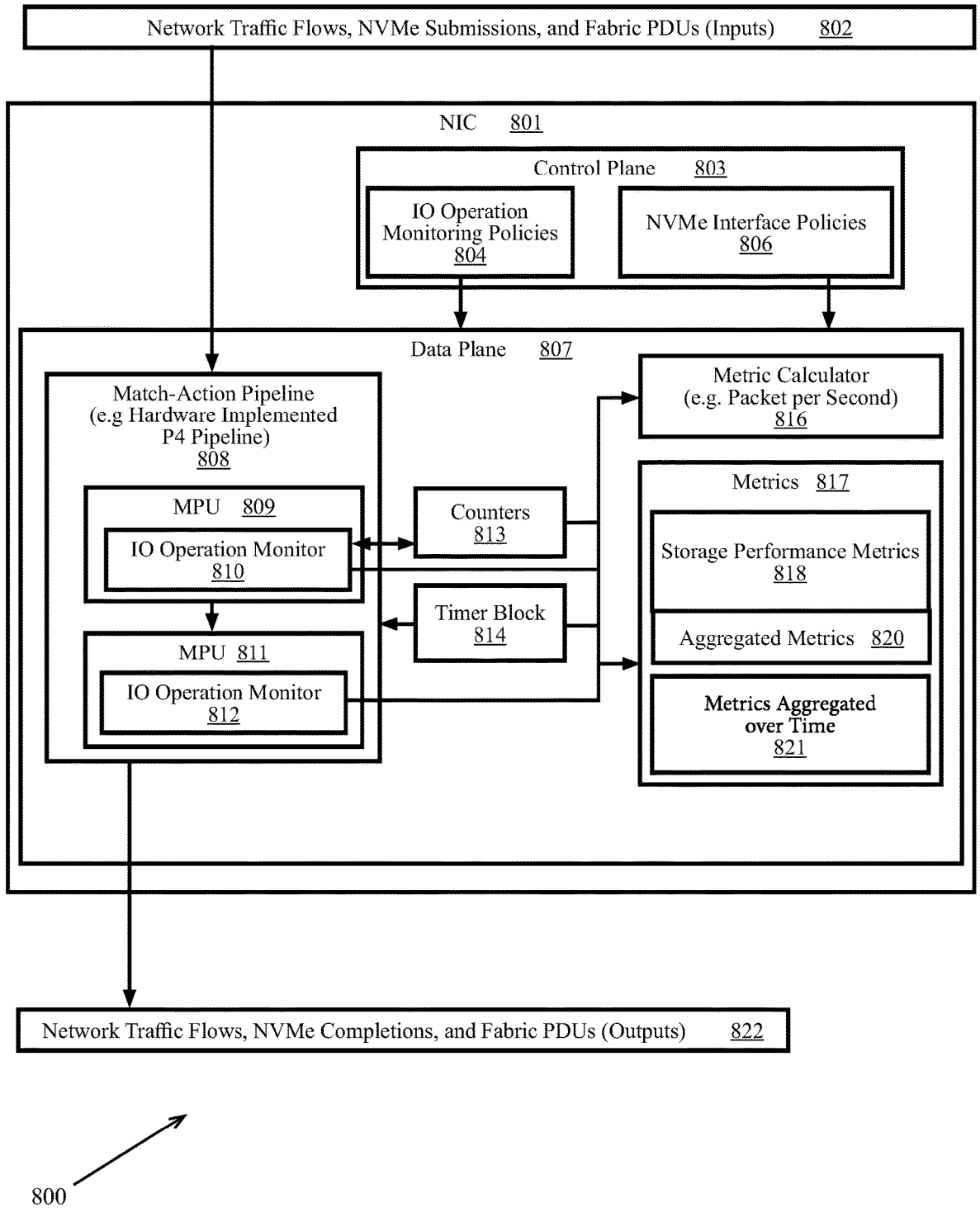
FIG. 8 is a high-level flow diagram of a NIC monitoring storage performance metrics of NVMe devices according to some aspects.

FIG. 8 is a high-level flow diagram 800 of a NIC 801 monitoring storage performance metrics of NVMe devices according to some aspects. The NIC 801 has a match-action pipeline 808 that receives inputs 802 and produces outputs 822. The inputs 802 to the NIC 801 can include network packets received by a RX-MAC, network traffic flows passing through the PCIe interface, NVMe submissions received via the PCIe interface, and fabric PDUs received by a RX-MAC. The outputs 822 of the NIC 801 can include network packets transmitted by a TX-MAC, network traffic flows passing through the PCIe interface, NVMe completions provided via the PCIe interface, and fabric PDUs transmitted by a TX-MAC. As discussed above, fabric PDUs may be considered to be types of network packets. The communications with NAS appliances, including storage transactions, may be considered to be types of network traffic flows.

The NIC 801 has a control plane 803 and a data plane 807. The control plane can be configured to implement IO operation monitoring policies 804 and NVMe interface policies 806. The control plane can configure the data plane (e.g. via P4 programming) to implement the IO operation monitoring policies 804 and the NVMe interface policies 806. The IO operation monitoring policies 804 are detailed below. The NVMe interface policies 806 can select which NAS appliances VF's attach to, maintain lists of NAS appliances (e.g. via fabric dependent discovery protocols or other information), and perform other functions.

The match-action pipeline 808 can include a hardware implemented P4 pipeline as discussed above. A first MPU 809 of the match action pipeline 808 can be configured to implement a first IO operation monitor 810. A second MPU 811 of the match action pipeline 808 can be configured to implement a second IO operation monitor 812. The data plane can include counters 813 that can count aggregate numbers of packets, packets with certain contexts (e.g. specific fabric PDUs, transactions with a specific NAS, etc.), and other items or events associated with the network traffic flows and storage transactions. The timer block 814 can include timers and can produce time values such as timestamps or elapsed times. A metric calculator 816 can receive lower levels metrics (e.g. packet counts from the counters, times or elapsed time from the timers, etc.) and can calculate other metrics such as bandwidth, throughput, packets per second (PPS), latencies, etc. Note: a calculation can use a monitoring policy's specified sampling interval instead of an elapsed time measurement. The network appliance can store metrics 817 such as storage performance metrics 818, aggregated metrics 820, and metrics aggregated over time 821. Storage performance metrics 818 relate to the NVMe submissions, NVMe completions, and fabric PDUs of the inputs 802 and outputs 822 processed by the NIC 801. Storage performance metrics can have a context such as a count of bytes in packets having a certain 5-tuple. Fabric PDUs having 5-tuples include those for NVMe/TCP, iSCSI, and NVMe/RoCE v2. Other SAN protocols have similar contexts. For example, Infiniband global route headers and base transport headers indicate contexts. A context can relate to IO block sizes. For example, a context can be set up as having a specific 5-tuple and to be for IO transactions within a specified block size range (e.g. less than 10 kB). Such a context could be useful in measuring the performance of a NAS for small block sizes. A performance metric having context related to a block size is a block size based performance metric.

A parameter, such as a storage performance metric 818, or many parameters/metrics, can be aggregated into an aggregation. Aggregated metrics 820 can relate to metrics that are gathered together. As such, aggregated metrics can be viewed as aggregations of parameters, the parameters being metrics, metadata, etc. Aggregated metrics can have a context. Non-limiting examples of contexts include: source address; destination address; source/destination pairs; services, protocol, and 5-tuple. An address may be specified as an address range. For example, an IPv4 subnet can be specified as an address and a subnet mask (i.e. 192.168.0.0/255.255.0.0 for all hosts on the 192.168.x.x subnet). A service may be determined by the destination port (e.g. NVMe/iWARP at TCP port 4420 and UDP port 4420). Note: iWARP is not an acronym, it relates to RDMA (remote direct memory access) as is used by RoCE. The service may also be determined by inspecting the layer 7 packet in a layer 4 payload, which is sometimes called deep packet inspection.

Aggregated metrics 820 can include collections of data within a context such as packet count, packet loss, bandwidth, and outstanding TCP connection requests for a destination address. Metrics aggregated over time 821 can include storage performance metrics 818, aggregated metrics 820, and other parameters that are aggregated over time by being stored periodically, added to a histogram bucket, stored in association with a timestamp, etc. Metrics aggregated over time 821 can be used for recording latencies, bandwidths, etc. The metrics 817 are illustrated as stored in the data plane. Certain of the metrics can be stored elsewhere such as in the HBM 411 of the NIC 401 of FIG. 4.

FIG. 9 illustrates a non-limiting set of storage performance metrics 901 that can be measured in real time by a network appliance according to some aspects. The storage performance metrics can be collected by a data plane, as discussed above. The storage performance metrics 901, which can be associated with NVMe/TCP, RoCE, iSCSI, and other SAN traffic can include: IO Read/Write Packet Rate (IO-PPS) 902; IO Read/Write Bandwidth (IO-BW) 903; IO Read/Write Setup Latency 904; IO Read/Write Completion Time 905; IO Read/Write Round Trip Time (IO-RTT) 906; IO Read/Write Active Time 907; IO Read/Write Rate (IOPS) 908; IO Read/Write Open Transactions 909; IO Read/Write Size 910; and other IO Metrics 911. Those familiar with storage performance monitoring are familiar with the exemplary metrics shown in FIG. 9. The network appliances and NICs 101, 401, 503, 801 of FIGS. 1, 4, 5, and 8 can be configured to generate the metrics of FIG. 9.

FIG. 10 illustrates a non-limiting set of IO operation monitoring policies 1001 that can be implemented by a network appliance according to some aspects. A control plane can implement the IO operation monitoring policies. A control plane can configure a data plane (e.g. via P4 programming) to implement the IO operation monitoring policies.

When implemented, the first four IO operation monitoring policies determine specific metrics every 10 seconds for NAS appliances in an active load balancing set. The NAS appliance can be assigned to service sets such as the active load balancing set, a monitored inactive set, and an out of service set. The specific service set to which a NAS device is assigned may be considered a context for the NAS device. The first IO operation monitoring policy 1002 determines IO Read/Write Completion Time (IO Latency) every 10 seconds for each target device in the active load balancing set. The second IO operation monitoring policy 1003 determines total IO-BW every 10 seconds for each target device in the active load balancing set. The third IO operation monitoring policy 1004 determines IO-BW and IO Latency for block size range 1 (e.g. 50 kB or smaller) every 10 seconds for each target device in the active load balancing set. The fourth IO operation monitoring policy 1005 determines IO-BW and IO Latency for block size range 2 (e.g. greater than 50 kB and no greater than 1 MB) every 10 seconds for each target device in the active load balancing set. The next two IO operation monitoring policies determine specific metrics for NAS appliances in the monitored inactive load balancing set. The fifth IO operation monitoring policy 1006 determines IO Latency every 60 seconds for each target device in the monitored inactive set. The sixth IO operation monitoring policy 1007 determines IO-BW every 120 seconds for each target device in the monitored inactive set.

For brevity, the first six IO operation monitoring policies are shown without a context except for service set. It is understood that further context can easily be included such as determining IO-BW every 120 seconds between a specific VF implemented by the NIC and a NAS device having a specific IP address. The seventh IO operation monitoring policy 1008 is a non-limiting example of a general form of a monitoring policy: determine {Metric} every {Time Period} for {Context}. Metric" can be any of the metrics illustrated in FIG. 9 or other metrics familiar to those practiced in the arts of network traffic monitoring or storage performance monitoring. "Time Period" can indicate the time interval between calculating or reading the metric. "Context" can indicate the set of target devices to monitor. For example, the context can be a service set, a list of specific devices, etc.

FIG. 11 is a high-level diagram illustrating a non-limiting example of a constraint-action table 1101 that can be implemented by a data plane according to some aspects. The constraint-action pairs indicate a constraint that, when triggered, causes one or more policies to be performed. The policies can be to move a target (e.g. a specific NAS) from one service set to another service set. The service sets can include a block size range N active load balancing set (e.g. block size range 1 active load balancing set), a block size range N monitored inactive set (e.g. block size range 1 active load balancing set), and a block size range N out of service set (e.g. block size range 1 out of service set).

The illustrated constraint-action pairs are as follows. A first constraint 1102 is triggered when the Target IO-BW<Target Allowed Minimum BW for any target in the active load balancing set. When the first constraint 1102 is triggered, the target that triggered the constraint is moved to the monitored inactive set 1103. A second constraint 1104 is triggered when the Target Latency>Target Allowed Max Latency for any target in the active load balancing set. When the second constraint 1104 is triggered, the target that triggered the constraint is moved to the monitored inactive set 1105. A third constraint 1106 is triggered when the Target IO-BW<Target Allowed Minimum BW for any target in the block size range 1 active load balancing set. When the third constraint 1106 is triggered, the target that triggered the constraint is moved to the block size range 1 monitored inactive set for 1107. A fourth constraint 1108 is triggered when the Target IO-BW<Target Allowed Minimum BW for any target in the block size range 2 active load balancing set. When the fourth constraint 1108 is triggered, the target that triggered the constraint is moved to the block size range 2 monitored inactive set 1109. A fifth constraint 1110 is triggered when the Target IO-BW>Target Onlining Minimum BW and the Target Latency<Target Onlining Max Latency for any target in the monitored inactive set. When the fifth constraint 1110 is triggered, the target that triggered the constraint is moved to the active load balancing set 1111. A sixth constraint 1112 is triggered when the Target IO-BW>Target Onlining Minimum BW and the Target Latency<Target Onlining Max Latency for any target in the block size range 1 monitored inactive set. When the sixth constraint 1112 is triggered, the target that triggered the constraint is moved to the block size range 1 active load balancing set 1113. A seventh constraint 1114 is triggered when the Target Latency>Target Allowed Max Latency and the Time Inactive>Maximum Allowed Inactive Period for any target in the monitored inactive set. When the seventh constraint 1114 is triggered, the target that triggered the constraint is moved to the out of service set 1115. An eighth constraint 1116 is triggered when the Target IO-BW<Target Allowed Minimum BW and the Time Inactive>Maximum Allowed Inactive Period for any target in the monitored inactive set. When the eighth constraint 1116 is triggered, the target that triggered the constraint is moved to the out of service set 1117.

The ninth constraint-action pair illustrates general forms for constraints and actions. The ninth constraint 1118 is triggered when a specified condition is met for any target in a specified service set. When the ninth constraint 1118 is triggered, the target that triggered the constraint is moved to another service set 1119.

Figure 12:
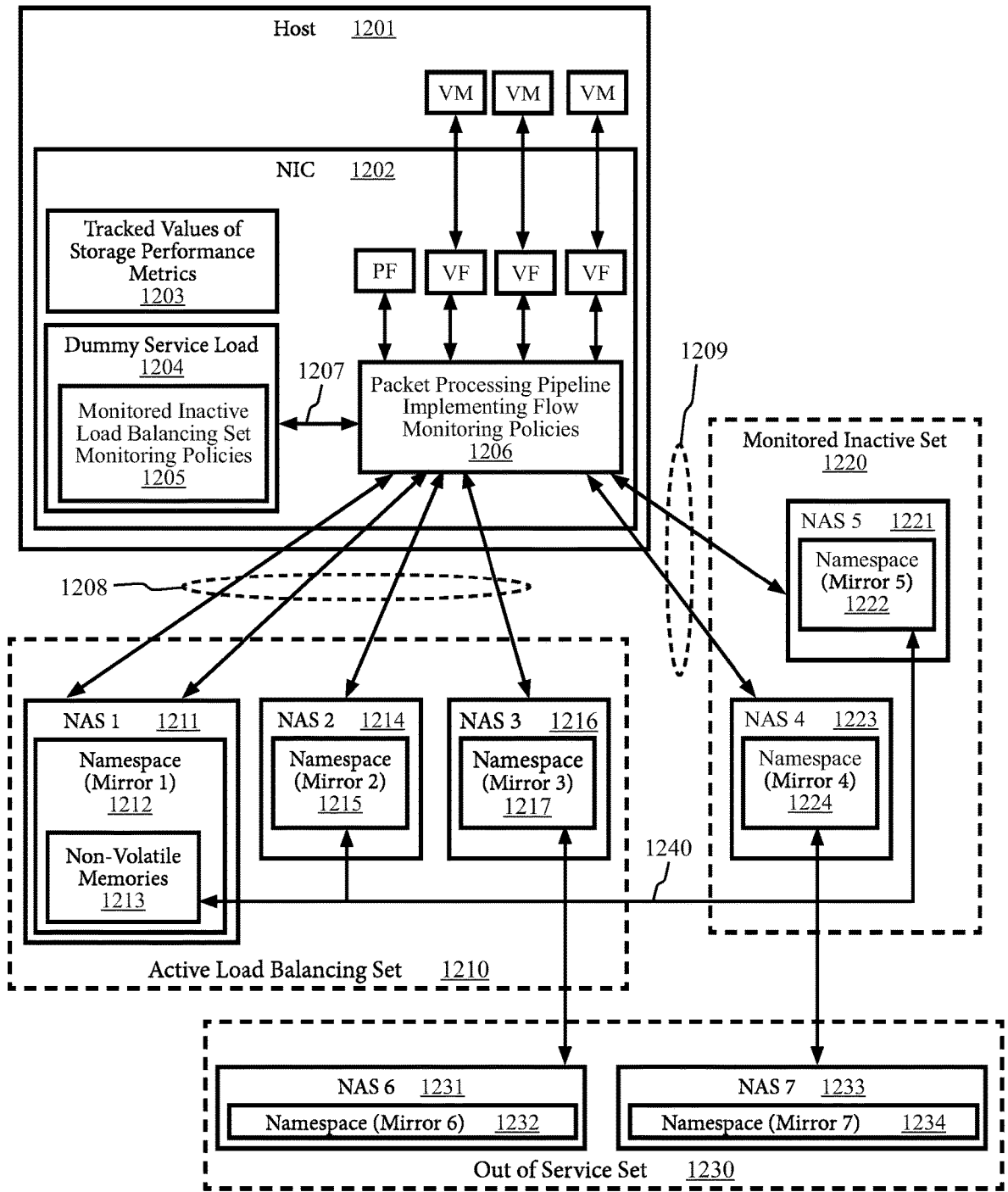
FIG. 12 is a high-level block diagram of an exemplary deployment performing NVMe target load balancing based on real time metrics according to some aspects.

FIG. 12 is a high-level block diagram of an exemplary deployment performing NVMe target load balancing based on real time metrics according to some aspects. A host computer 1201 can access remote storage via a NIC 1202 providing a PF that is a NVMe interface PF. VMs running on the host 1201 can access remote storage via NVMe interface VFs provided by the NIC 1202. The NIC 1202 can also provide network connectivity to the host and VMs via a network interface PF and network interface VFs.

The NIC 1202 has a packet processing pipeline 1206 that implements flow monitoring policies such as those of FIG. 10. As such, the data plane of the NIC 1202 can measure and calculate storage performance metrics, such as those of FIG. 9, for various contexts such as for specific service sets, specific 5-tuples, etc. Values obtained for the storage performance metrics can be stored in memory as tracked values of storage performance metrics. The memory can be NIC memory or any other memory that the NIC can access. Memory on the NIC may be preferable because, for example, a hardware implemented packet processing pipeline can use network on a chip circuits to store values for storage performance metrics in a HBM or in match-action unit cache memory. A dummy service load 1204 can implement monitoring policies 1205 for exercising NAS devices in a monitored inactive set.

Three service sets are illustrated. The three illustrated service sets are the active load balancing set 1210, the monitored inactive set 1220, and the out of service set 1230. The service sets can contain NAS indicators with each NAS indicator indicating a NAS device. The service sets can be maintained by data structures, such as lists or arrays, stored in the NIC's memory or in other memory accessible by the NIC 1202. The active load balancing set 1210 indicates the NAS appliances that the NVMe interface PF and NVMe interface VFs in the NIC 1202 can attach to and use for accessing the namespaces served by the NAS devices. The monitored inactive set 1220 indicates the NAS appliances that the NVMe interface PF and NVMe interface VFs in the NIC 1202 will not be attached to but that the NIC 1202 monitors. The out of service set 1230 indicates NAS devices that the NIC will not use. Note that an administrator or some form of administrative intervention/command may move a NAS device from one service set to a different service set. As such, there is a pathway for an out of service NAS to move to the active load balancing set 1210. There may be additional service sets such as context specific service sets.

There can be a block size range N active load balancing set, a block size range N monitored inactive set, and a block size range N out of service set. For example, the block size range 1 active load balancing set can indicate the NAS appliances that the NVMe interface PF and NVMe interface VFs in the NIC 1202 can attach to and use for storage transactions within block size range 1. The block size range 1 monitored inactive set can indicate the NAS appliances that the NVMe interface PF and NVMe interface VFs in the NIC 1202 will not use for storage transactions within block size range 1 but that the NIC 1202 monitors with block size range 1 dummy transactions. The out of service set 1230 indicates NAS devices that the NIC will not use for storage transactions within block size range 1. It is conceivable that a specific NAS device can be in the active load balancing set for one block size range and out of service for a different block size range.

As discussed above, the data plane can produce storage metrics by monitoring the storage transactions between the NIC and the NAS devices. The host and VMs can originate storage transactions that access the NAS devices in an active load balancing set. As such, storage metrics are produced for the NAS devices in an active load balancing set. The host and VMs may never originate a storage transaction that accesses any of the NAS devices in a monitored inactive set. As such, storage performance metrics might not be produced because there are no transactions that originate from the PF and VFs. The dummy service load 1204 can originate storage transactions that access the NAS devices in a monitored inactive set such that storage performance metrics are produced for monitored inactive devices. The packet processing pipeline produces storage performance metrics for a NAS regardless of the source originating the storage transactions.

The active load balancing set is illustrated as including NAS 1 1211, NAS 2 1214, and NAS 3 1216. The monitored inactive set 1220 is illustrated as including NAS 4 1223 and NAS 5 1221. The out of service set is illustrated as including NAS 6 1231 and NAS 7 1233. The NAS devices serve a mirrored namespace to hosts and VMs over fabric connections such as active fabric connections 1208 and monitoring connections 1209. The namespace can be mirrored using a NAS network 1240 that may be dedicated to mirroring namespaces served by NAS devices. Each NAS appliance can maintain its own local mirrored copy of the namespace in its own non-volatile memory. NAS 1 1211 maintains a first mirror 1212 of the namespace in a non-volatile memory 1213. NAS 2 1214 maintains a second mirror 1215 of the namespace. NAS 3 1216 maintains a third mirror 1217 of the namespace. NAS 4 1223 maintains a fourth mirror 1224 of the namespace. NAS 5 1221 maintains a fifth mirror 1222 of the namespace. NAS 6 1231 maintains a sixth mirror 1232 of the namespace. NAS 7 1233 maintains a seventh mirror 1234 of the namespace.

Figure 13:
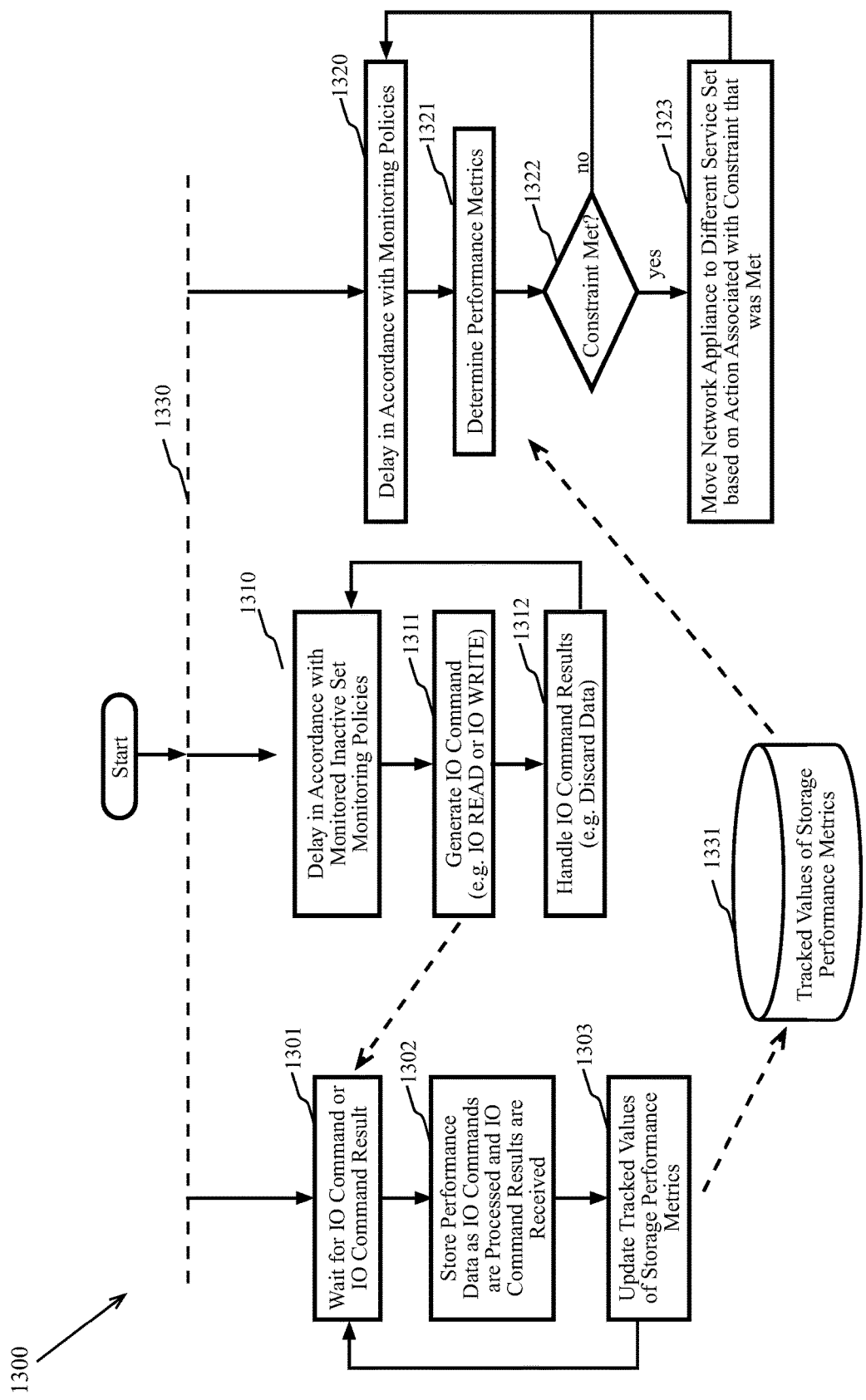
FIG. 13 is a high-level block diagram of a process implementing aspects of NVMe target load balancing based on real time metrics according to some aspects.

FIG. 13 is a high-level block diagram of a process implementing aspects of NVMe target load balancing based on real time metrics according to some aspects. After the start, the process waits 1330 for an event such as receiving a command, receiving a command result, or the timeout of a timer.

Blocks 1301, 1302, and 1303 illustrate activities that can be performed by a data plane or packet processing pipeline that is measuring storage performance metrics. At block 1301, the process has been waiting for an IO command or an IO command result. At block 1302 the process produces performance data by measuring storage performance metrics. The performance data can be stored as IO commands are processed and as IO command results are received. At block 1303, the tracked values of storage performance metric can be updated. For example, counts of receive/transmitted packets, aggregate bandwidth, or average latency can be updated. The tracked values of the storage metrics can be stored in a memory 1331. The process can loop back to waiting for an event or timer timeout.

Blocks 1310, 1311, and 1312 illustrate activities that can be performed by a dummy service load. At block 1310, the process has been waiting for a timer to timeout after a delay in accordance with a monitored inactive set monitoring policy. For example, one policy can be to originate transactions writing 50 kB of data to monitored inactive NAS devices every second and another policy can be to originate transactions reading 100 kB of data from monitored inactive NAS devices every half second. As such, timeouts can be received every second for one policy and every half second for the other policy. At block 1311, an IO command (e.g. a read command or a write command) is generated in accordance with the monitoring policies. The data plane monitors the storage transaction initiated by the IO command just as it would any other IO command. At block 1312, the results of the IO command can be handled. Typically, read results and non-erroneous command results can be discarded. The process can loop back to waiting for an event or timer timeout.

Blocks 1320, 1321, 1322, and 1323 illustrate activities that can be performed by a data plane or control plane implementing monitoring policies. At block 1310, the process has been waiting for a timer to timeout after a delay in accordance with a monitoring policy. At block 1321, storage performance metrics are determined. The storage performance metrics can be read from the memory 1331. Depending on the storage performance metrics stored by the data plane, some metrics may need to be calculated. At block 1322, the process determines if a constraint has been met. FIG. 11 illustrates some constraints. If no constraint has been met, the process can loop back to waiting for an event or timer timeout. If a constraint has been met, the process can perform an action (e.g. policy 1103, 1105, 1107, 1109, 1111, 1113, 1115, 1117, or 1119) associated with the constraint before looping back to waiting for an event or timer timeout.

Determining the performance metrics may involve calculating storage performance metrics from raw performance data. For example, the data plane may update, in memory 1331, a count of received bytes as fabric PDUs are received. The count of received bytes is one piece of raw performance data that may be used to calculate input bandwidth. Those practiced in calculating storage performance metrics are familiar with the raw data (e.g. packet/byte counts, timestamps) that can be gathered and used to calculate performance metrics.

Figure 14:
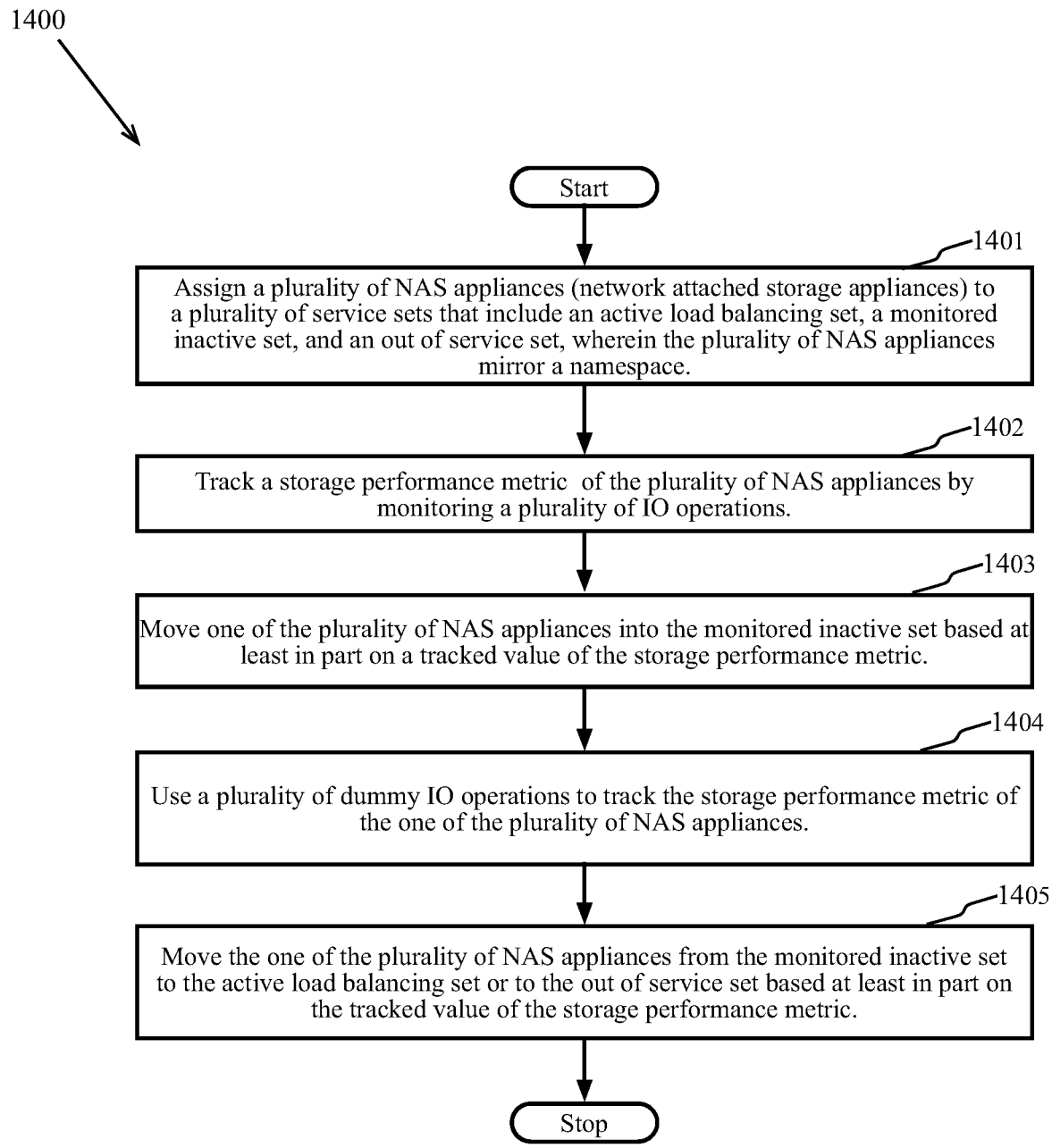
FIG. 14 is a high-level block diagram of a method for NVMe target load balancing based on real time metrics according to some aspects.

FIG. 14 is a high-level block diagram of a method for NVMe target load balancing based on real time metrics according to some aspects. After the start, at block 1401 a plurality of NAS appliances (network attached storage appliances) are assigned to a plurality of service sets that include an active load balancing set, a monitored inactive set, and an out of service set, wherein the plurality of NAS appliances mirror a namespace. At block 1402, the method tracks a storage performance metric of the plurality of NAS appliances by monitoring a plurality of IO operations. At block 1403, the method moves one of the plurality of NAS appliances into the monitored inactive set based at least in part on a tracked value of the storage performance metric. At block 1404, the method uses a plurality of dummy IO operations to track the storage performance metric of the one of the plurality of NAS appliances. At block 1405, the method moves the one of the plurality of NAS appliances from the monitored inactive set to the active load balancing set or to the out of service set based at least in part on the tracked value of the storage performance metric.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniB and interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method implemented by a network appliance, the method comprising:
    assigning a plurality of NAS appliances (network attached storage appliances) to a plurality of service sets that include an active load balancing set, a monitored inactive set, and an out of service set, wherein the plurality of NAS appliances are configured to mirror a namespace;
    tracking a storage performance metric of the plurality of NAS appliances by monitoring a plurality of IO operations for accessing a non-volatile memory in the namespace;
    moving a NAS appliance into the monitored inactive set based at least in part on a tracked value of the storage performance metric;
    using dummy IO operations to track the storage performance metric of the NAS appliance that was moved into the monitored inactive set; and
    moving the NAS appliance from the monitored inactive set into the active load balancing set or into the out of service set in response to a value of the storage performance metric that was tracked using the dummy IO operations.

2. The method implemented by the network appliance of claim 1, wherein:
    the network appliance includes a control plane and a data plane, and
    the data plane is configured to track the storage performance metric of the plurality of NAS appliances.

3. The method implemented by the network appliance of claim 1, wherein:
    the network appliance includes a P4 packet processing pipeline configured to track the storage performance metric of the plurality of NAS appliances.

4. The method implemented by the network appliance of claim 1, wherein the network appliance includes special purpose hardware implementing a packet processing pipeline configured to track the storage performance metric of the plurality of NAS appliances.

5. The method implemented by the network appliance of claim 1, wherein the plurality of IO operations includes a plurality of NVMe commands (Non-Volatile Memory Express commands) received from a host system via a NVMe submission queue implemented by the network appliance.

6. The method implemented by the network appliance of claim 1, wherein the network appliance is a SR-IOV (single root IO virtualization) capable PCIe (peripheral component interface express) card installed in a host computer and configured to provide a SR-IOV VF (virtual function) having a NVMe submission queue and a NVMe completion queue, and
    wherein the plurality of IO operations includes a plurality of NVMe commands received via the NVMe submission queue from a VM (virtual machine) running on the host computer.

7. The method implemented by the network appliance of claim 1, wherein the storage performance metric is an IO latency metric.

8. The method implemented by the network appliance of claim 1, wherein the storage performance metric is an IO throughput metric.

9. The method implemented by the network appliance of claim 1, wherein the storage performance metric is a block size based metric.

10. A network appliance comprising:
    a memory; and
    a cpu core operatively coupled to the memory,
    wherein the network appliance is configured to:
        assign a plurality of NAS appliances (network attached storage appliances) to a plurality of service sets that include an active load balancing set, a monitored inactive set, and an out of service set, wherein the plurality of NAS appliances are configured to mirror a namespace;
        track a storage performance metric of the plurality of NAS appliances by monitoring a plurality of IO operations for accessing a non-volatile memory in the namespace;
        move a NAS appliance into the monitored inactive set based at least in part on a tracked value of the storage performance metric;

use dummy IO operations to track the storage performance metric of the NAS appliance that was moved into the monitored inactive set; and move the NAS appliance from the monitored inactive set into the active load balancing set or into the out of service set in response to a value of the storage performance metric that was tracked using the dummy IO operations.

11. The network appliance of claim 10, wherein the network appliance includes:
a control plane; and
a data plane is configured to track the storage performance metric of the plurality of NAS appliances.

12. The network appliance of claim 10, wherein the network appliance includes:
a control plane; and
a data plane that includes a P4 packet processing pipeline configured to track the storage performance metric of the plurality of NAS appliances.

13. The network appliance of claim 10, wherein the network appliance includes special purpose hardware implementing a packet processing pipeline configured to track the storage performance metric of the plurality of NAS appliances.

14. The network appliance of claim 10,
wherein the network appliance is configured to provide a NVMe submission queue to a host system, and
wherein the NVMe submission queue is configured to receive a plurality of NVMe commands for accessing the non-volatile memory in the namespace.

15. The network appliance of claim 10, wherein the network appliance is a SR-IOV (single root IO virtualization) capable PCIe (peripheral component interface extended) card installed in a host system and configured to provide a VF (virtual function) including a NVMe submission queue and a NVMe completion queue to a VM (virtual machine) running on the host system.

16. The network appliance of claim 10, wherein the storage performance metric is an IO latency metric.

17. The network appliance of claim 10, wherein the storage performance metric is an IO throughput metric.

18. The network appliance of claim 10, wherein the storage performance metric is a block size based metric.

19. A network appliance comprising:
a means for assigning a plurality of NAS appliances (network attached storage appliances) to a plurality of service sets that include an active load balancing set, a monitored inactive set, and an out of service set, wherein the plurality of NAS appliances are configured to mirror a namespace;
a means for accessing a non-volatile memory in the namespace via the plurality of NAS appliances;
a means for quantifying IO performance of the plurality of NAS appliances based on the means for accessing the non-volatile memory;
a means for determining that a NAS appliances is to be moved into the monitored inactive set;
a means for determining that the NAS appliances is to be moved out of the monitored inactive set; and
a means for moving the NAS appliances into and out of the monitored inactive set.

20. The network appliance of claim 19 further comprising:
a means for providing a NVMe command queue to a VM (virtual machine) running in a means for running the VM, wherein the means for running the VM comprises the network appliance.

* * * * *